United States Patent
Okada et al.

(10) Patent No.: US 9,931,982 B2
(45) Date of Patent: Apr. 3, 2018

(54) IMAGE GENERATING APPARATUS, IMAGE DISPLAYING SYSTEM, PARAMETER ACQUIRING APPARATUS, IMAGE GENERATING METHOD AND PARAMETER ACQUIRING METHOD

(71) Applicant: FUJITSU TEN LIMITED, Kobe-shi, Hyogo (JP)

(72) Inventors: Naoyuki Okada, Kobe (JP); Masahiro Yamada, Kobe (JP); Yasuyoshi Sawada, Kobe (JP); Takumi Hayashida, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 365 days.

(21) Appl. No.: 14/419,777

(22) PCT Filed: Jul. 31, 2013

(86) PCT No.: PCT/JP2013/070720
§ 371 (c)(1),
(2) Date: Feb. 5, 2015

(87) PCT Pub. No.: WO2014/034364
PCT Pub. Date: Mar. 6, 2014

(65) Prior Publication Data
US 2015/0183371 A1    Jul. 2, 2015

(30) Foreign Application Priority Data

Aug. 30, 2012    (JP) ................................. 2012-189604

(51) Int. Cl.
*B60R 1/00*    (2006.01)
*H04N 5/225*    (2006.01)
(Continued)

(52) U.S. Cl.
CPC ............ *B60R 1/00* (2013.01); *G06K 9/00791* (2013.01); *G06T 3/4038* (2013.01); *G06T 7/80* (2017.01);
(Continued)

(58) Field of Classification Search
None
See application file for complete search history.

(56) References Cited

U.S. PATENT DOCUMENTS

2004/0196368 A1    10/2004    Asai
2010/0066833 A1     3/2010    Ohshima et al.

FOREIGN PATENT DOCUMENTS

JP    H08-276787 A    10/1996
JP    2004306670 A    11/2004
(Continued)

OTHER PUBLICATIONS

Translation of Sep. 17, 2013 International Search Report issued in International Patent Application No. PCT/JP2013/070720.
(Continued)

*Primary Examiner* — Kate Luo
(74) *Attorney, Agent, or Firm* — Oliff PLC

(57) ABSTRACT

There is provided an image generation apparatus used for a vehicle having side mirrors. An image acquisition unit is configured to acquire a plurality of captured images obtained by a plurality of cameras including side cameras provided in the side mirrors. A generation unit is configured to generate a composite image which indicates a periphery of the vehicle viewed from a virtual viewpoint, by using target areas defined for the respective captured images. A state acquisition unit is configured to acquire a developed or folded state of the side mirrors. The generation unit changes the target areas in accordance with the developed or folded state of the side mirrors.

8 Claims, 19 Drawing Sheets

(51) Int. Cl.
    *H04N 7/18*     (2006.01)
    *G06K 9/00*     (2006.01)
    *G06T 3/40*     (2006.01)
    *G06T 7/80*     (2017.01)
    *H04N 5/232*     (2006.01)
    *H04N 5/247*     (2006.01)
    *H04N 5/262*     (2006.01)

(52) U.S. Cl.
    CPC ............ *H04N 5/225* (2013.01); *H04N 7/181* (2013.01); *H04N 7/183* (2013.01); *B60R 2300/303* (2013.01); *B60R 2300/605* (2013.01); *B60R 2300/70* (2013.01); *G06T 2207/30252* (2013.01); *H04N 5/23238* (2013.01); *H04N 5/247* (2013.01); *H04N 5/2628* (2013.01)

(56) References Cited

FOREIGN PATENT DOCUMENTS

| | | | |
|---|---|---|---|
| JP | 2010069944 A | 4/2010 | |
| JP | 2011015174 A | 1/2011 | |

OTHER PUBLICATIONS

Sep. 17, 2013 Written Opinion issued in Application No. PCT/JP2013/070720.
Jun. 7, 2016 Office Action issued in Japanese Patent Application No. 2012-189604.

(a)

(b)

(b)

(a)

IMAGE GENERATING APPARATUS, IMAGE DISPLAYING SYSTEM, PARAMETER ACQUIRING APPARATUS, IMAGE GENERATING METHOD AND PARAMETER ACQUIRING METHOD

TECHNICAL FIELD

The present invention relates to a technology for generating an image indicating a periphery of a vehicle.

BACKGROUND ART

In the related art, an image display system configured to generate an image indicating a periphery of a vehicle such as an automobile and to display the image on a display apparatus in the vehicle has been known. By using the image display system, a user (a driver, as a representative example) can check a periphery situation of the vehicle substantially in real time.

Also, in recent years, an image display system configured to compose a plurality of captured images, to generate a composite image, which indicates a periphery of a vehicle viewed from a virtual viewpoint, and to display the composite image has been also suggested (for example, refer to Patent Document 1). In the image display system, it is possible to generate an overhead image, which is a composite image as if the periphery of the vehicle were viewed from above of the vehicle. The user can check an overall situation of the vehicle periphery by visually recognizing the composite image.

PRIOR ART DOCUMENT

Patent Document

[Patent Document 1] Japanese Patent Application Publication No. 2011-15174A

SUMMARY OF INVENTION

Problems to Be Solved by Invention

Side cameras configured to acquire captured images, which indicate sides of the vehicle, of the plurality of captured images are generally provided for side mirrors that can be shifted from a developed state to a folded state. For this reason, when the side mirrors are shifted from the developed state to the folded state, optical axis directions of the side cameras provided for the side mirrors are also changed.

Therefore, when a composite image is generated on the basis of the captured images obtained at the folded state of the side mirrors by the same method as the developed state of the side mirrors, a composite image in which images of photographic subjects are composed without being matched may be generated.

It is therefore an object of the present invention to provide a technology for generating a composite image in which images of photographic subjects are composed with being matched, irrespective of a state of side mirrors.

Means for Solving Problems

In order to achieve the above object, according to a first aspect that can be taken by the present invention, there is provided an image generation apparatus used for a vehicle having side mirrors, the image generation apparatus including an image acquisition unit configured to acquire a plurality of captured images obtained by a plurality of cameras including side cameras provided in the side mirrors, a generation unit configured to generate a composite image which indicates a periphery of the vehicle viewed from a virtual viewpoint, by using target areas defined for the respective captured images, and a state acquisition unit configured to acquire a developed or folded state of the side mirrors, wherein the generation unit changes the target areas in accordance with the developed or folded state of the side mirrors.

According to the above image generation apparatus, the target areas defined in the captured images obtained by the cameras provided in the side mirrors are changed in accordance with the state of the side mirrors. Thereby, it is possible to generate a composite image in which images of photographic subjects are composed with being matched, irrespective of the state of the side mirrors.

The generation unit may define the target areas on the basis of a first parameter at the developed state of the side mirrors, and define the target areas on the basis of a second parameter at the folded state of the side mirrors. Here, the first parameter indicates an error in directions of optical axes of the side cameras at the developed state of the side mirrors, and the second parameter indicates an error in directions of optical axes of the side cameras at the folded state of the side mirrors.

According to the above configuration, the target areas are defined on the basis of the errors in the directions of the optical axes at each state of the developed and folded states of the side mirrors, so that it is possible to generate the composite image more precisely.

The image generation apparatus may further include a first parameter acquisition unit configured to acquire the first parameter at an actually developed state of the side mirrors, and a second parameter acquisition unit configured to acquire the second parameter at an actually folded state of the side mirrors.

According to the above configuration, it is possible to appropriately acquire the first parameter and the second parameter necessary for generation of the composite image.

In the image generation apparatus, the generation unit may generate a boundary part between the plurality of captured images in the composite image by blending two captured images with the corresponding boundary part being interposed therebetween.

According to the above configuration, when generating the boundary part between the captured images in the composite image by blending the two captured images, it is possible to appropriately superimpose the images of the photographic subjects each other.

In the image generation apparatus, the generation unit may generate a boundary part between the plurality of captured images in the composite image by blending two captured images with the corresponding boundary part being interposed therebetween, at one state of the developed and folded states of the side mirrors, and display a boundary part between the plurality of captured images in the composite image with a mask image for which the captured images are not used, at the other state of the developed and folded states of the side mirrors.

According to the above configuration, at the one state of the side mirrors, since the boundary part between the captured images in the composite image is generated by, blending the two captured images, it is possible to generate a natural image. Also, at the other state of the side mirrors, since the boundary part between the captured images in the composite image is displayed with the mask image, it is possible to prevent the images of the photographic subjects from being superimposed and displayed without being matched.

In order to achieve the above object, according to a second aspect that can be taken by the present invention, there is provided an image display system used for a vehicle, the image display system including the image generation apparatus according to the first aspect, and a display apparatus configured to display the composite image output from the image generation apparatus.

In order to achieve the above object, according to a third aspect that can be taken by the present invention, there is provided an image generation method used for a vehicle having side mirrors, the method including (a) acquiring a plurality of captured images obtained by a plurality of cameras including side cameras provided in the side mirrors, (b) generating a composite image which indicates a periphery of the vehicle viewed from a virtual viewpoint, by using target areas defined for the respective captured images, and (c) acquiring a developed or folded state of the side mirrors, wherein the process (b) includes changing the target areas in accordance with the developed or folded state of the side mirrors.

According to the above image display system and the image generation method, it is possible to accomplish the same effects as the image generation apparatus according to the first aspect.

In order to achieve the above object, according to a fourth aspect that can be taken by the present invention, there is provided a parameter acquisition apparatus configured to acquire parameters relating to cameras provided in side mirrors of a vehicle, the parameter acquisition apparatus including an acquisition unit configured to acquire a developed or folded state of the side mirrors, a first parameter acquisition unit configured to acquire a first parameter at an actually developed state of the side mirrors, the first parameter indicating an error in directions of optical axes of the cameras, and a second parameter acquisition unit configured to acquire a second parameter at an actually folded state of the side mirrors, the second parameter indicating an error in directions of optical axes of the cameras.

In order to achieve the above object, according to a fifth aspect that can be taken by the present invention, there is provided a parameter acquisition method of acquiring parameters relating to cameras provided in side mirrors of a vehicle, the method including (a) acquiring a developed or folded state of the side mirrors, (b) acquiring a first parameter at an actually developed state of the side mirrors, the first parameter indicating an error in directions of optical axes of the cameras, and (c) acquiring a second parameter at an actually folded state of the side mirrors, the second parameter indicating an error in directions of optical axes of the cameras.

According to the parameter acquisition apparatus and the parameter acquisition method, it is possible to appropriately acquire the first parameter and the second parameter necessary for generation of the appropriate composite image, at each state of the developed and folded states of the side mirrors.

EMBODIMENTS OF INVENTION

Hereinafter, illustrative embodiments of the present invention will be described with reference to the accompanying drawings.

<First Illustrative Embodiment>

<1-1. Configuration>

Figure 1:
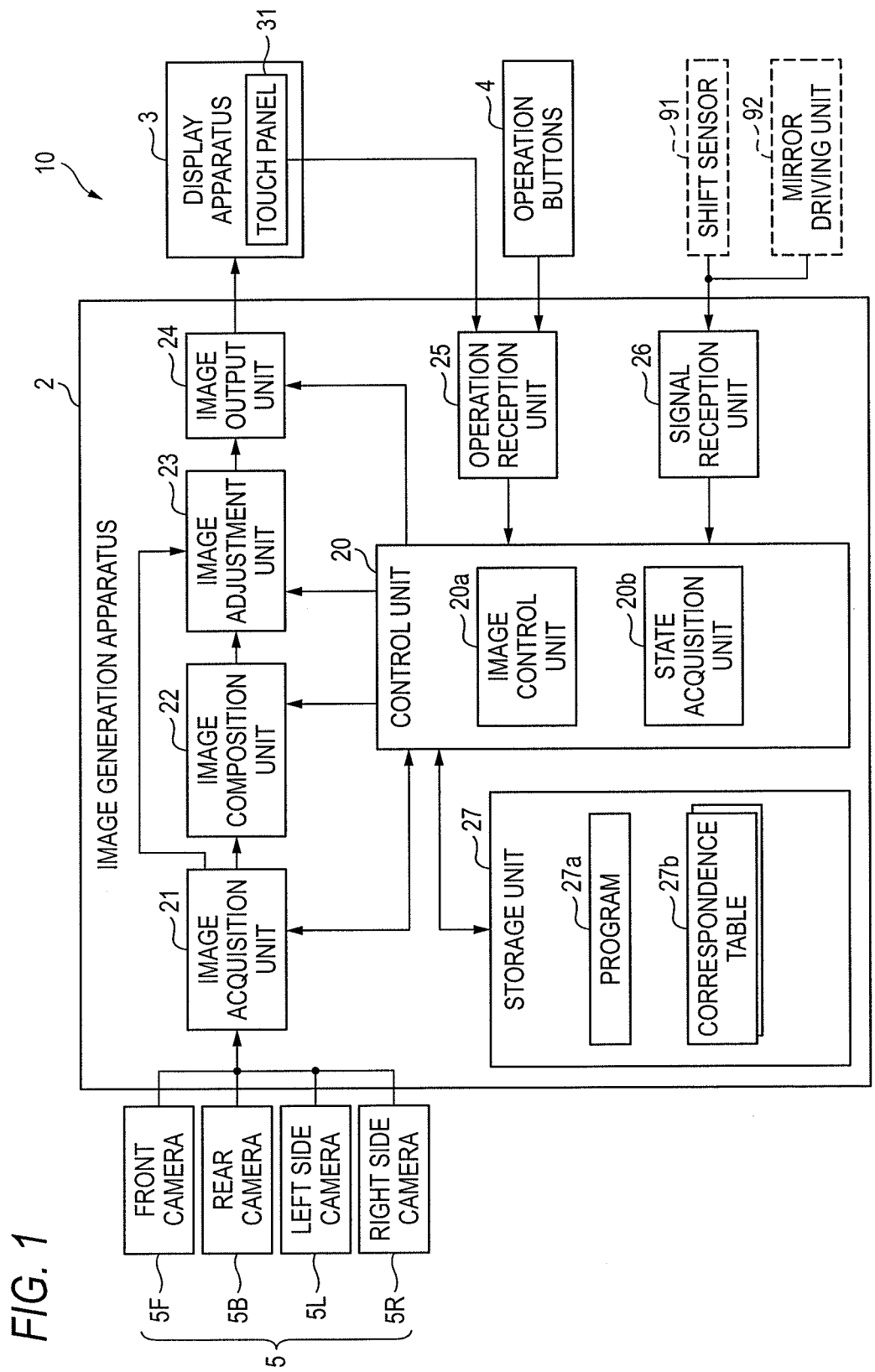
FIG. 1 illustrates a configuration of an image display system according to a first illustrative embodiment.

FIG. 1 illustrates a configuration of an image display system 10 according to a first illustrative embodiment. The image display system 10 is used for a vehicle (an automobile, in this illustrative embodiment) and has a function of generating an image, which indicates a periphery area of the vehicle, and displaying the image in the vehicle. By using the image display system 10, a user (a driver, as a representative example) of the image display system 10 can recognize a periphery situation of the vehicle substantially in real time.

As shown in FIG. 1, the image display system 10 has a plurality of cameras 5, an image generation apparatus 2, a display apparatus 3 and operation buttons 4. Each of the cameras 5 is configured to capture a periphery of the vehicle, to acquire a captured image and to input the acquired captured image to the image generation apparatus 2. The image generation apparatus 2 is configured to generate a display image for display on the display apparatus 3 by using the captured images indicating the periphery of the vehicle. The display apparatus 3 is configured to display the display image generated in the image generation apparatus 2. Also, the operation buttons 4 are configured to receive a user's operation.

Figure 2:
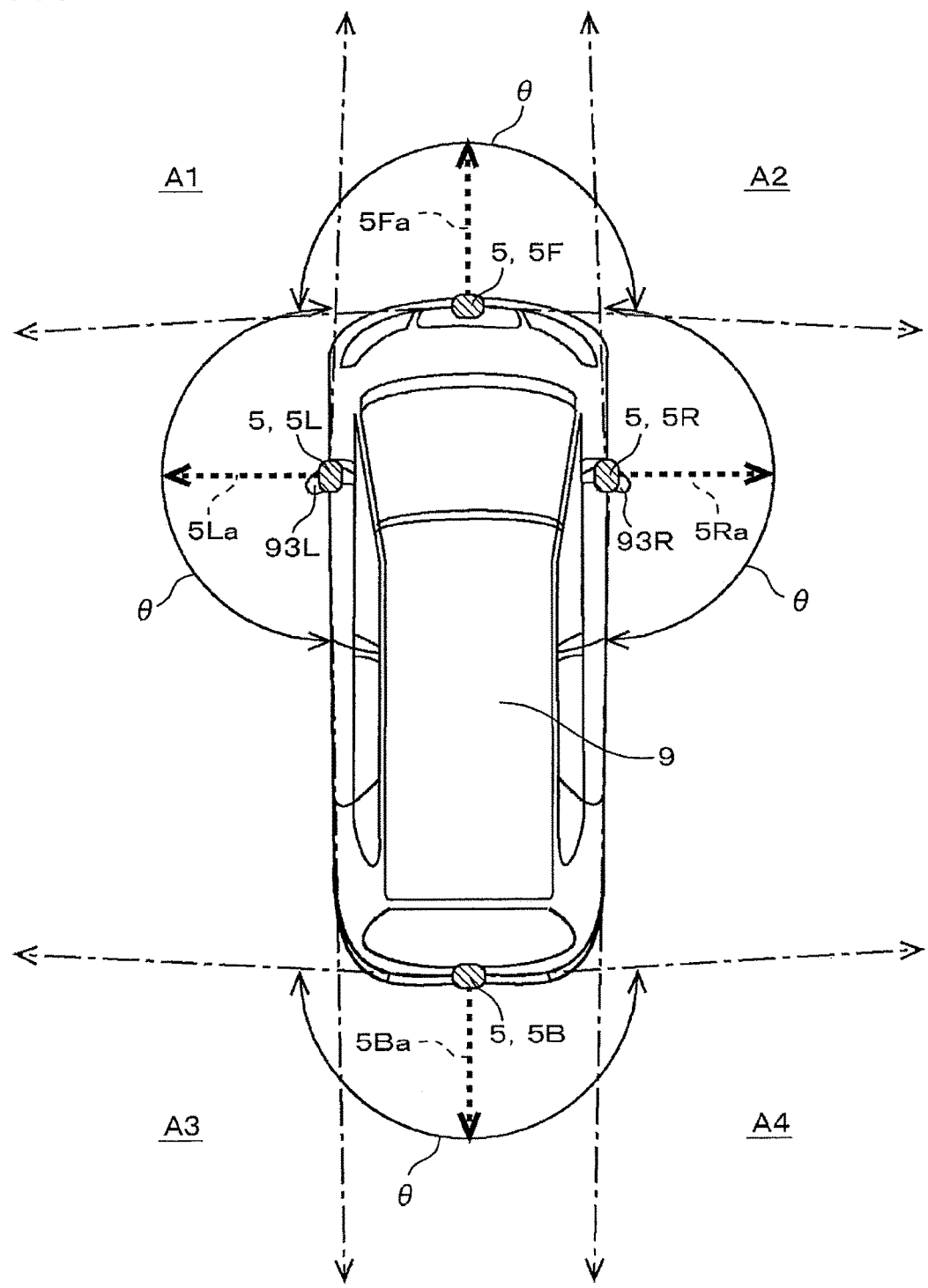
FIG. 2 illustrates directions along which cameras provided in the image display system of FIG. 1 capture images.

Each of the cameras 5 has a lens and a capturing element and is configured to electronically acquire the captured image indicating the periphery of the vehicle. The plurality of cameras 5 includes a front camera 5F, a rear camera 5B, a left side camera 5L and a right side camera 5R. As shown in FIG. 2, the four cameras 5F, 5B, 5L, 5R are arranged at different positions on a vehicle 9 and are configured to capture different directions of the periphery of the vehicle 9.

FIG. 2 illustrates directions along which the four cameras 5F, 5B, 5L, 5R capture images. The front camera 5F is provided at a front end of the vehicle 9, and an optical axis 5Fa thereof faces in a straight traveling direction of the vehicle 9. The rear camera 5B is provided at a rear end of the vehicle 9, and an optical axis 5Ba thereof faces in an opposite direction to the straight traveling direction of the vehicle 9.

Also, the left side camera 5L is provided in a left side mirror 93L arranged on a left side surface of the vehicle 9. In the meantime, the right side camera 5R is provided in a right side mirror 93R arranged on a right side surface of the vehicle 9. The side mirrors 93L, 93R can be shifted from a developed state (a state where the driver can check a side rear of the vehicle 9) to a folded state. At the developed state of the left side mirror 93L, an optical axis 5La of the left side camera 5L faces in a left direction of the vehicle 9 (a direction substantially orthogonal to the straight traveling direction). Also, at the developed state of the right side mirror 93R, an optical axis 5Ra of the right side camera 5R faces in a right direction of the vehicle 9 (a direction substantially orthogonal to the straight traveling direction).

As the lenses of the cameras 5, wide angle lenses such as fish-eye lenses are adopted. Each of the cameras 5 has a 180° or greater angle of view. For this reason, it is possible to capture the entire periphery of the vehicle 9 by using the four cameras 5F, 5B, 5L, 5R. Respective areas A1, A2, A3, A4 in a left front, a right front, a left rear and a right rear of the vehicle 9 can be overlappingly captured by the two cameras 5 of the four cameras 5.

As shown in FIG. 1, the display apparatus 3 has a touch panel 31. The touch panel 31 is provided in a thin-type display panel such as a liquid crystal type and an organic EL type, and can receive a user's operation. The display panel is configured to display a variety of information and images. The display apparatus 3 is arranged on an instrument panel and the like of the vehicle 9 so that the user can visually recognize a screen of the display panel. The display apparatus 3 may be arranged in the same housing as the image generation apparatus 2 and integrated with the image generation apparatus 2, or alternatively, may be a separate apparatus from the image generation apparatus 2.

The operation buttons 4 are an operation member for receiving a user's operation. The operation buttons 4 are provided on a steering wheel of the vehicle 9, for example, and are configured to mainly receive an operation from the driver. The user can perform a variety of operations on the image display system 10 through the operation buttons 4 and the touch panel 31 of the display apparatus 3. When the user operates any one of the operation buttons 4 and the touch panel 31, an operation signal indicating a content of the corresponding operation is input to the image generation apparatus 2.

The image generation apparatus 2 is an electronic apparatus 2 capable of executing a variety of image processing, and has an image acquisition unit 21, an image composition unit 22, an image adjustment unit 23 and an image output unit 24.

The image acquisition unit 21 is an example of image acquisition unit and is configured to acquire the images captured by the four cameras 5F, 5B, 5L, 5R. The image acquisition unit 21 has an image processing function of converting an analog captured image into a digital captured image, for example. The image acquisition unit 21 is configured to perform predetermined image processing for the acquired captured images and to input the captured images after the processing to the image composition unit 22 and the image adjustment unit 23.

The image composition unit 22 is a hardware circuit configured to perform image processing for generating a composite image. The image composition unit 22 is an example of generation unit, and is configured to compose a plurality of captured images acquired by the plurality of cameras 5, thereby generating a composite image indicating a periphery of the vehicle 9 viewed from a virtual view point. The method of generating the composite image will be described in detail later.

The image adjustment unit 23 is configured to generate a display image for display on the display apparatus 3. The image adjustment unit 23 is configured to generate a display image including the composite image and the captured images by using the composite image generated by the image composition unit 22 and the captured images acquired by the image acquisition unit 21.

The image output unit 24 is configured to output the display image generated in the image adjustment unit 23 to the display apparatus 3 and to display the display image on the display apparatus 3. Thereby, the composite image indicating the periphery of the vehicle 9 viewed from the virtual view point is displayed on the display apparatus 3.

Also, the image generation apparatus 2 further has a control unit 20, an operation reception unit 25, a signal reception unit 26 and a storage unit 27. The control unit 20 is a microcomputer having a CPU, a RAM, a ROM and the like, for example, and is configured to collectively control the entire image generation apparatus 2.

The operation reception unit 25 is configured to receive operation signals that are transmitted from the operation buttons 4 and the touch panel 31 when the user performs an operation. Thereby, the operation reception unit 25 receives a user's operation. The operation reception unit 25 is configured to input the received operation signals to the control unit 20.

The signal reception unit 26 is configured to receive a signal transmitted from an apparatus separately provided in the vehicle 9, and to output the signal to the control unit 20. The signal reception unit 26 is configured to receive signals transmitted from a shift sensor 91 and a mirror driving unit 92, for example.

The shift sensor 91 is configured to detect a shift position, which is a position of a shift lever of a transmission of the vehicle 9, and to transmit a signal indicating the shift position to the image generation apparatus 2. Based on this signal, the control unit 20 can determine whether the vehicle 9 travels forwards or rearwards.

Also, the mirror driving unit 92 is configured to rotate both left and right side mirrors 93L, 93R in response to a user's instruction and to shift the side mirrors 93L, 93R from one state of the developed state and the folded state to the other state. The mirror driving unit 92 is configured to transmit a signal, which indicates the developed/folded state of the side mirrors 93L, 93R, to the image generation apparatus 2.

The storage unit 27 is a non-volatile memory such as a flash memory, and is configured to store therein a variety of information. The storage unit 27 is configured to store therein a program 27a serving as firmware and a variety of data used to generate the composite image by the image composition unit 22. The data used for generation of the composite image includes a plurality of correspondence tables 27b.

The CPU executes calculation processing in response to the program 27a stored in the storage unit 27, so that a variety of functions of the control unit 20 are implemented. An image control unit 20a and a state acquisition unit 20b, which are shown, are parts of functional units that are implemented as the CPU executes the calculation processing in response to the program 27a.

The image control unit 20a is configured to control the image composition unit 22 for generating a composite image and the image adjustment unit 23 for generating a display image. The image control unit 20a is configured to control the image composition unit 22 and the image adjustment unit 23 to generate a composite image and a display image in accordance with a state of the vehicle 9 and a user's operation.

Also, the state acquisition unit 20b is an example of state acquisition unit, and is configured to acquire the developed/folded state of the side mirrors 93L, 93R. The state acquisition unit 20b is configured to acquire any of the developed/folded state of the side mirrors 93L, 93R, based on the signal transmitted from the mirror driving unit 92.

<1-2. Generation of Composite Image>

Figure 3:
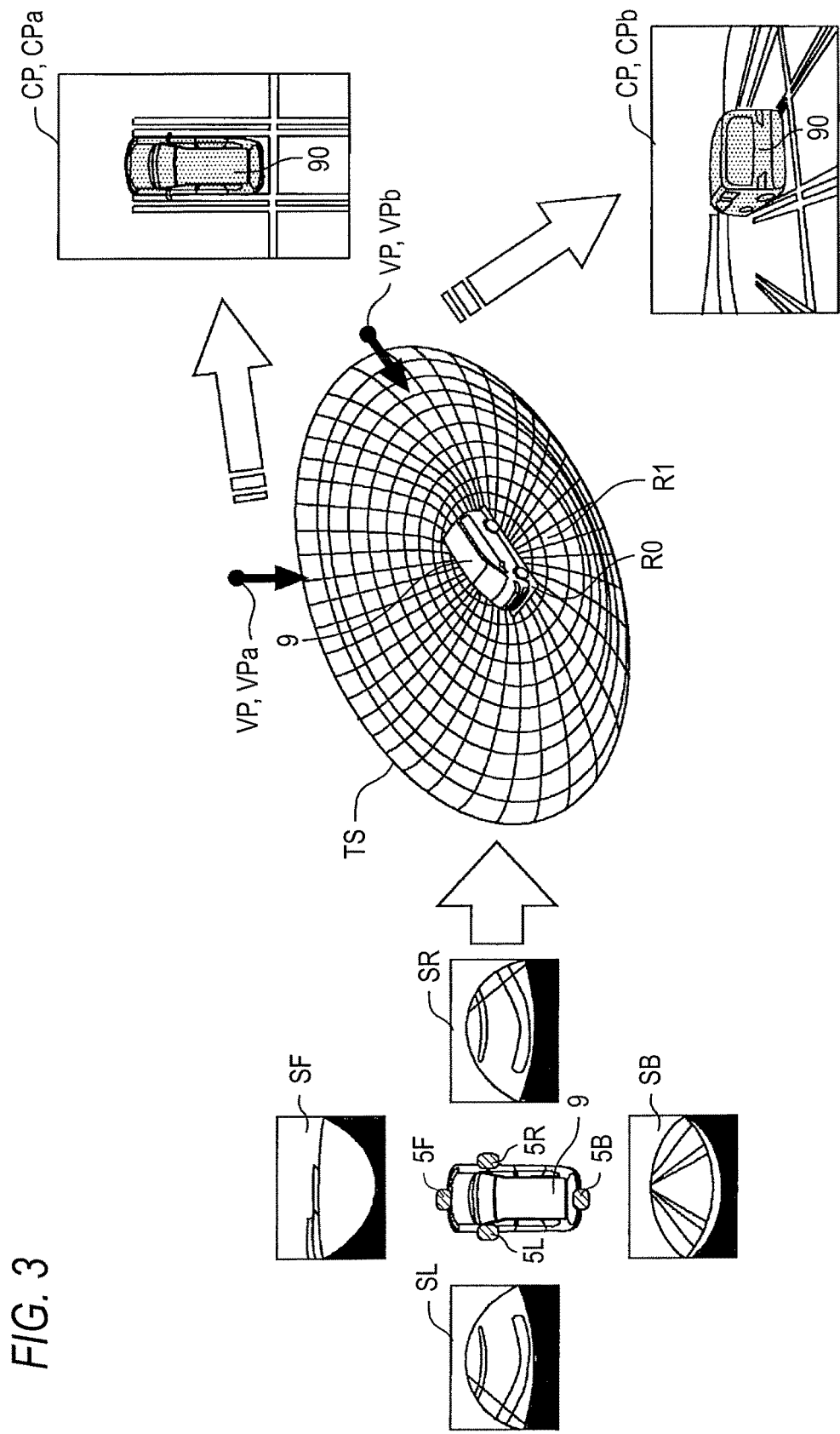
FIG. 3 illustrates a method with which an image composition unit provided in the image display system of FIG. 1 generates a composite image.

Subsequently, the method of generating a composite image indicating a periphery situation of the vehicle 9 viewed from the virtual view point is described. FIG. 3 illustrates a method with which the image composition unit 22 generates a composite image.

When the capturing is performed in the front camera 5F, the rear camera 5B, the left side mirror 5L and the right side mirror 5R, respectively, four captured images SF, SB, SL, SR indicating a front, a rear, a left side and a right side of the vehicle 9 are acquired. The four captured images SF, SB, SL, SR include data indicating the entire periphery of the vehicle 9.

The image composition unit 22 projects the data (values of pixels) included in the four captured images SF, SB, SL, SR to a stereoscopic curved surface TS of a virtual three-dimensional space. The stereoscopic curved surface TS is a virtual projection plane corresponding to a periphery area of the vehicle 9.

The stereoscopic curved surface TS has a substantially hemispherical shape (a bowl shape), for example, and a center area (a bottom part of the bowl) is defined as a vehicle area R0, which is a position of the vehicle 9. The image composition unit 22 does not project the captured image data to the vehicle area (the position of the vehicle 9) R0 of the stereoscopic curved surface TS and projects the captured image data to a projection area R1, which is an outer area of the vehicle area R0. Each position of the projection area R1 is associated with any one data of the four captured images SF, SB, SL, SR. The image composition unit 22 projects the data of the four captured images SF, SB, SL, SR to the corresponding positions of the projection area R1, respectively.

Figure 4:
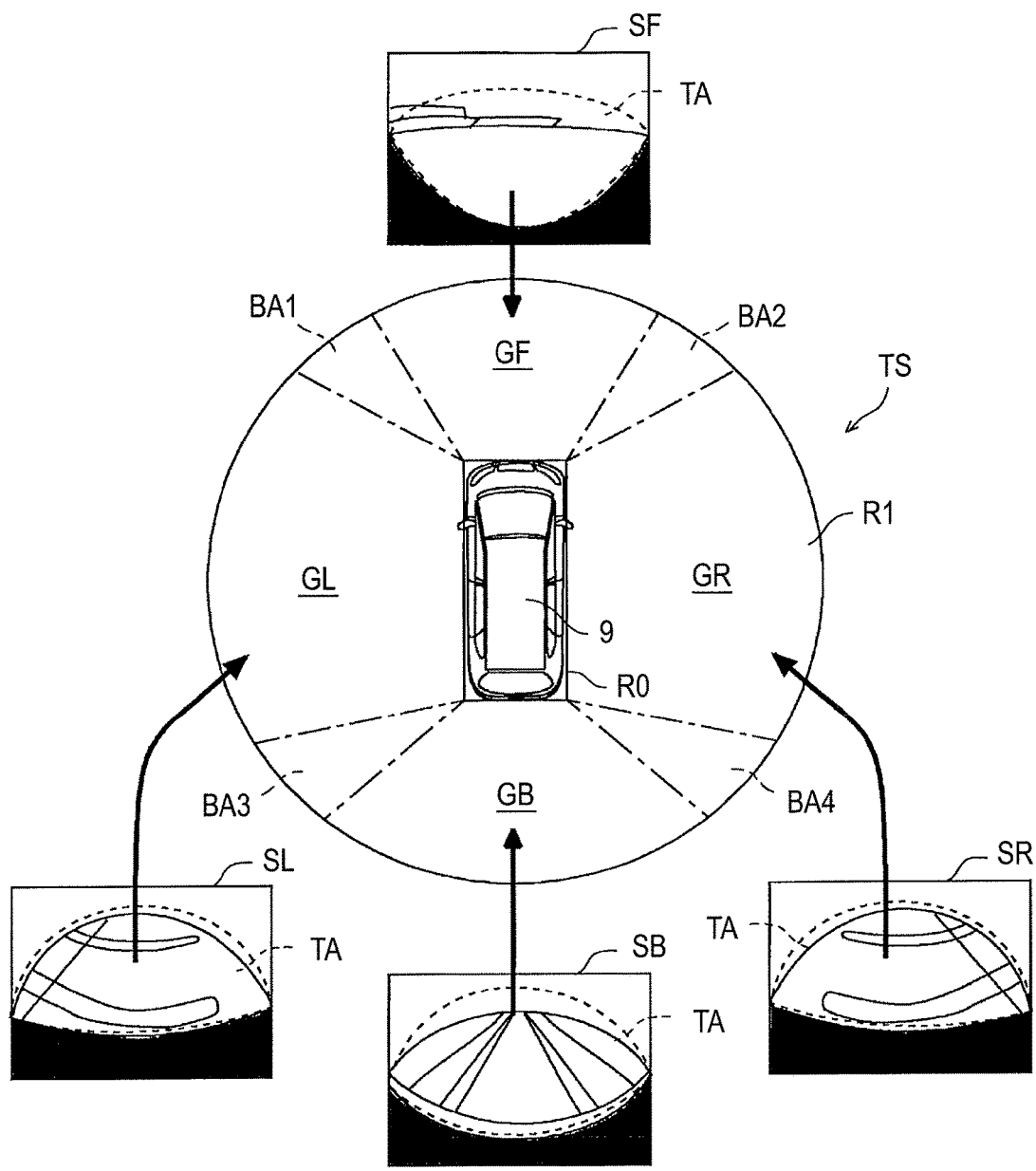
FIG. 4 illustrates a corresponding relation between parts of a stereoscopic curved surface of FIG. 3 and captured images.

As shown in FIG. 4, the image composition unit 22 projects data of the captured image SF of the front camera 5F to a part GF of the projection area R1, which corresponds to the front of the vehicle 9. Also, the image composition unit 22 projects data of the captured image SB of the rear camera 5B to a part GB of the projection area R1, which corresponds to the rear of the vehicle 9. Further, the image composition unit 22 projects data of the captured image SL of the left side camera 5L to a part GL of the projection area R1, which corresponds to the left side of the vehicle 9, and projects data of the captured image SR of the right side camera 5R to a part GR of the projection area R1, which corresponds to the right side of the vehicle 9.

In the projection area R1, data of target areas TA, which are parts of the four captured images SF, SB, SL, SR, are projected, not the data of the entire areas of the four captured images SF, SB, SL, SR. That is, the image composition unit 22 generates a composite image CP by using the respective target areas TA of the four captured images SF, SB, SL, SR.

The data in the captured image and each position of the projection area R1 to which the data should be projected are associated by the correspondence tables 27b, which are table data beforehand stored in the storage unit 27. Therefore, the respective target areas (the areas used for generation of the composite image CP) TA of the four captured images SF, SB, SL, SR are defined by the correspondence tables 27b. Each of the target areas TA of the four captured images SF, SB, SL, SR is determined as an area in which an image of a photographic subject of the periphery of the vehicle 9 in the corresponding captured image is included.

When the captured image data is projected to the projection area R1 of the stereoscopic curved surface TS shown in FIG. 3, as described above, the image composition unit 22 virtually configures a polygon model representing a three-dimensional shape of the vehicle 9. The model of the vehicle 9 is arranged at the vehicle area R0 that is a position of the vehicle 9 in the three-dimensional space in which the stereoscopic curved surface TS is set.

Then, the image composition unit 22 sets a virtual view point VP with respect to the three-dimensional space under control of the image control unit 20a. The image composition unit 22 can set the virtual view point VP at any view point position of the three-dimensional space towards any view direction. The image composition unit 22 cuts, as an image, the data projected to an area of the stereoscopic curved surface TS, which is included in a predetermined angle of view as viewed from the set virtual view point VP. Also, the image composition unit 22 performs a rendering for the model of the vehicle 9 in accordance with the set virtual view point VP, and superimposes a two-dimensional vehicle image 90 resulting from the rendering over the cut image. Thereby, the image composition unit 22 generates a composite image CP indicating the vehicle 9 viewed from the virtual view point VP and the periphery area of the vehicle 9.

For example, as shown in FIG. 3, when a virtual view point VPa of which a view point position is just above the vehicle 9 and a view direction is just below the vehicle is set, a composite image (an overhead image) CPa looking down at the vehicle 9 and the periphery area of the vehicle 9 is generated. Also, when a virtual view point VPb of which a view point position is the left rear of the vehicle 9 and a view direction is the front of the vehicle is set, a composite image CPb indicating the vehicle 9 and the periphery area of the vehicle 9 is generated so that the entire periphery of the vehicle is viewed from the left rear of the vehicle 9. In this illustrative embodiment, the image composition unit 22 can set, as the virtual view point VP, the virtual view point VPa as if the vehicle were viewed from just above of the vehicle 9. Thereby, the image composition unit 22 can generate an overhead image that is a composite image looking down at the vehicle 9 and the periphery of the vehicle 9.

In the process of generating the composite image CP, as shown in FIG. 4, boundary parts BA1 to BA4 between the parts GF, GB, GL, GR of the projection area R1 of the stereoscopic curved surface TS are projected with both data of two captured images that should be respectively projected to the two parts with the boundary part being interposed therebetween. The data of the boundary parts BA1 to BA4 has a value obtained by alpha-blending the two projected captured image data in the same ratio. For example, the data of the boundary part BA1 between the part GF corresponding to the front of the vehicle 9 and the part GL of the projection area R1 corresponding to the left side of the vehicle 9 has a value obtained by alpha-blending the data of the captured image SF of the front camera 5 and the data of the captured image SL of the left side camera 5L.

Since the image composition unit 22 cuts the data of the stereoscopic curved surface TS to generate the composite image CP, the boundary parts BA1 to BA4 of the stereoscopic curved surface TS correspond to boundary parts between the captured images used for the composite image CP. Therefore, the image composition unit 22 generates the boundary part between the captured images of the composite image CP by blending the two captured images with the corresponding boundary part being interposed therebetween.

<1-3. Display Image>

Figure 5:
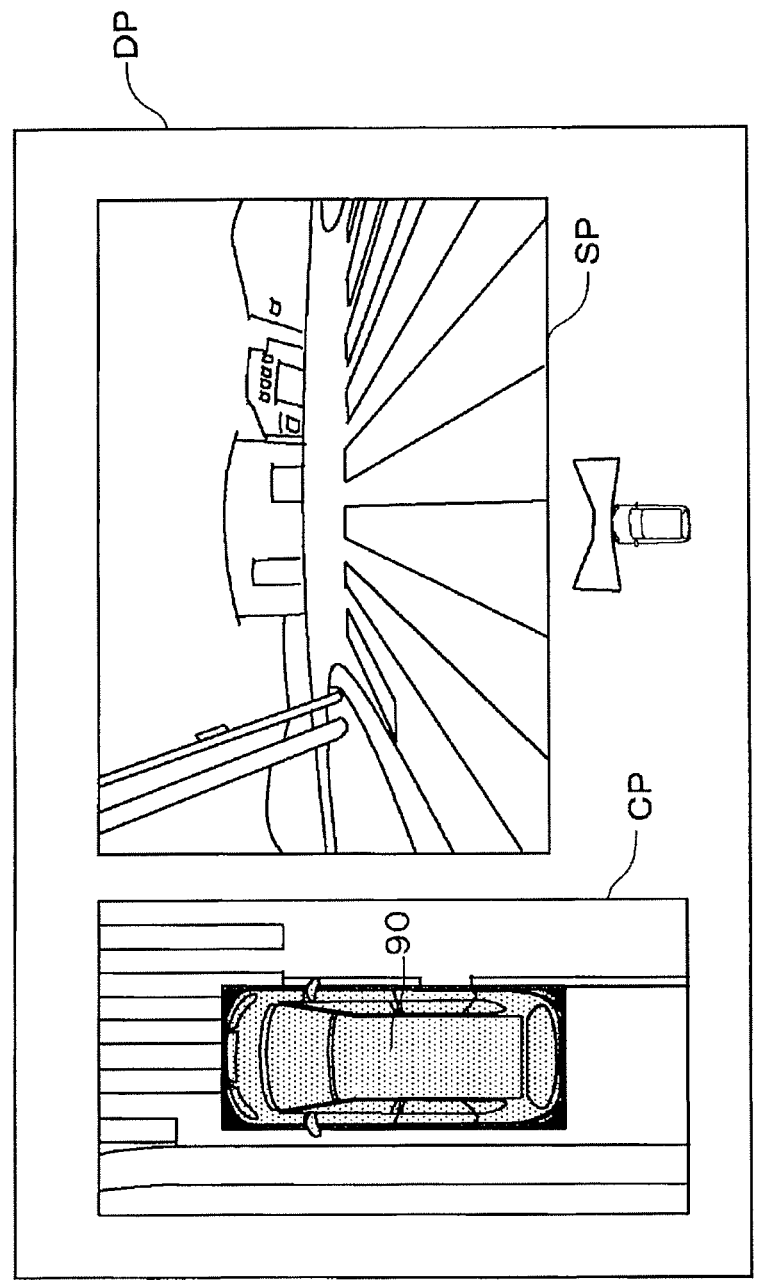
FIG. 5 illustrates an example of a display image generated by an image adjustment unit provided in the image display system of FIG. 1.

Subsequently, the display image that is generated by the image adjustment unit 23 is described. FIG. 5 illustrates an example of a display image DP generated by the image adjustment unit 23. The display image DP shown in FIG. 5 is displayed on the display apparatus 3 so that the user can visually recognize the same.

As shown in FIG. 5, the display image DP includes the composite image CP and a captured image SP. The composite image CP included in the display image DP is an overview image that is a composite image looking down at the periphery of the vehicle 9 from just above of the vehicle 9.

Also, the captured image SP included in the display image DP is selected on the basis of a traveling direction of the vehicle 9. When the vehicle 9 travels forwards, the captured image SF acquired from the front camera 5F is used as the captured image SP of the display image DP. In the meantime, when the vehicle 9 travels rearwards, the captured image SB acquired from the rear camera 5B is used as the captured image SP of the display image DP. The traveling direction of the vehicle 9 is determined by the image control unit 20a on the basis of the signal transmitted from the shift sensor 91.

The user visually recognizes the display image DP to understand a situation of the traveling direction of the vehicle 9 on the basis of the captured image SP and also to understand a situation of the entire periphery of the vehicle 9 on the basis of the composite image CP. The image display system 10 is configured to generate the composite image CP included in the display image DP not only at the developed state of the side mirrors 93L, 93R but also at the folded state of the side mirrors 93L, 93R.

<1-4. State Shift of Side Mirrors>

As previously described, the side cameras 5L, 5R are respectively provided in the side mirrors 93L, 93R. For this reason, when the side mirrors 93L, 93R are shifted from the developed state to the folded state, the positions and directions of the optical axes of the side cameras 5L, 5R are also correspondingly changed.

Figure 6:
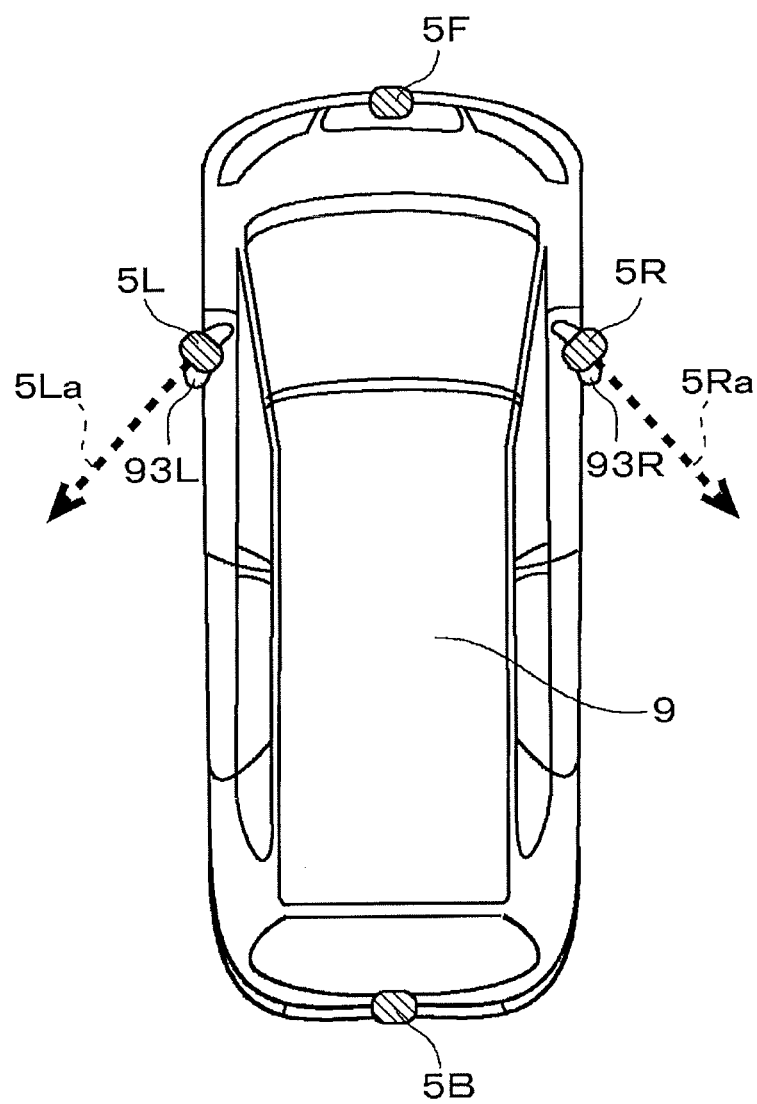
FIG. 6 illustrates a folded state of side mirrors of a vehicle having the image display system of FIG. 1 mounted thereto.

FIG. 6 illustrates the folded state of the side mirrors 93L, 93R. As described above, at the developed state of the side mirrors 93L, 93R, the directions of the optical axes 5La, 5Lb of the side cameras 5L, 5R are substantially orthogonal to the straight traveling direction of the vehicle 9 (refer to FIG. 2). On the other hand, as shown in FIG. 6, at the folded state of the side mirrors 93L, 93R, the directions of the optical axes 5La, 5Lb of the side cameras 5L, 5R face more rearwards, as compared to the developed state.

Also, the positions at which the side cameras 5L, 5R are provided are not on rotational shafts when the side mirrors 93L, 93R are rotated. For this reason, when the side mirrors 93L, 93R are shifted from the developed state to the folded state, the positions of the side cameras 5L, 5R relative to the vehicle 9 are also changed.

Accordingly, when the side mirrors 93L, 93R are shifted from the developed state to the folded state, directions and ranges of the images of the photographic subjects included in the captured images acquired by the side cameras 5L, 5R are correspondingly changed.

Figure 7:
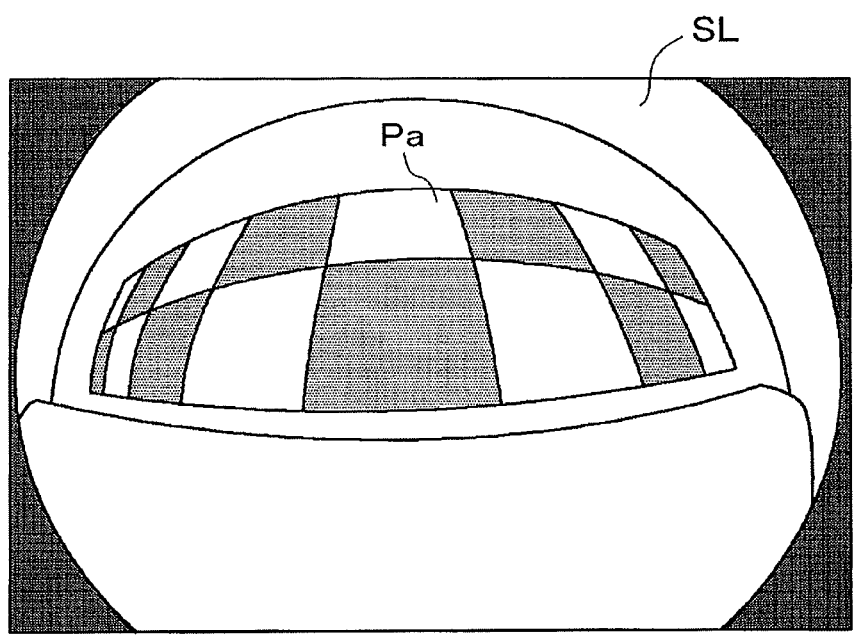
FIG. 7 illustrates examples of a captured image acquired by a left side camera provided in the image display system of FIG. 1.
Figure 7:
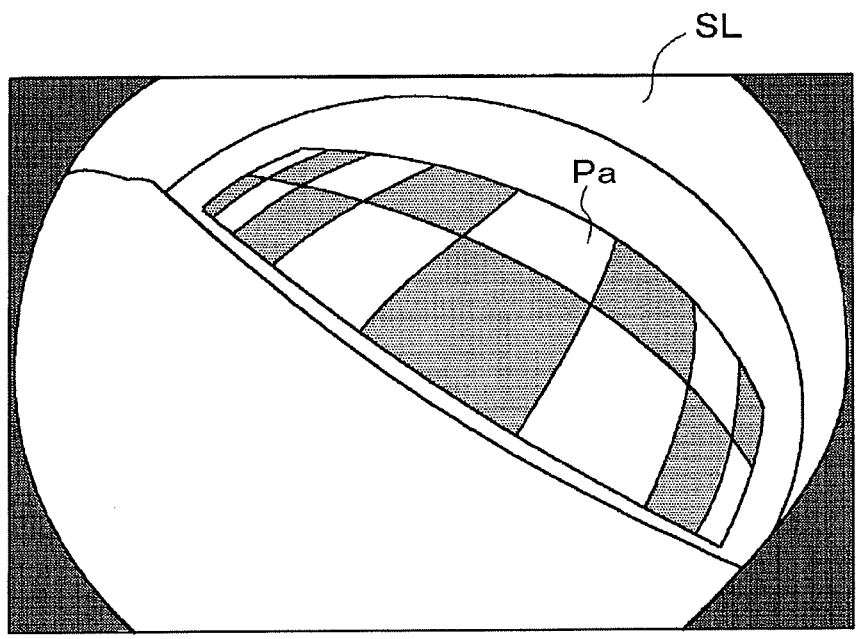

FIG. 7 illustrates examples of the captured image SL acquired by the left side camera 5L. The two captured images SL shown in FIG. 7 are acquired in the same situation as FIG. 8. FIG. 7A illustrates the captured image SL acquired at the developed state of the left side mirror 93L, and FIG. 7B illustrates the captured image SL acquired at the folded state of the left side mirror 93L.

Figure 8:
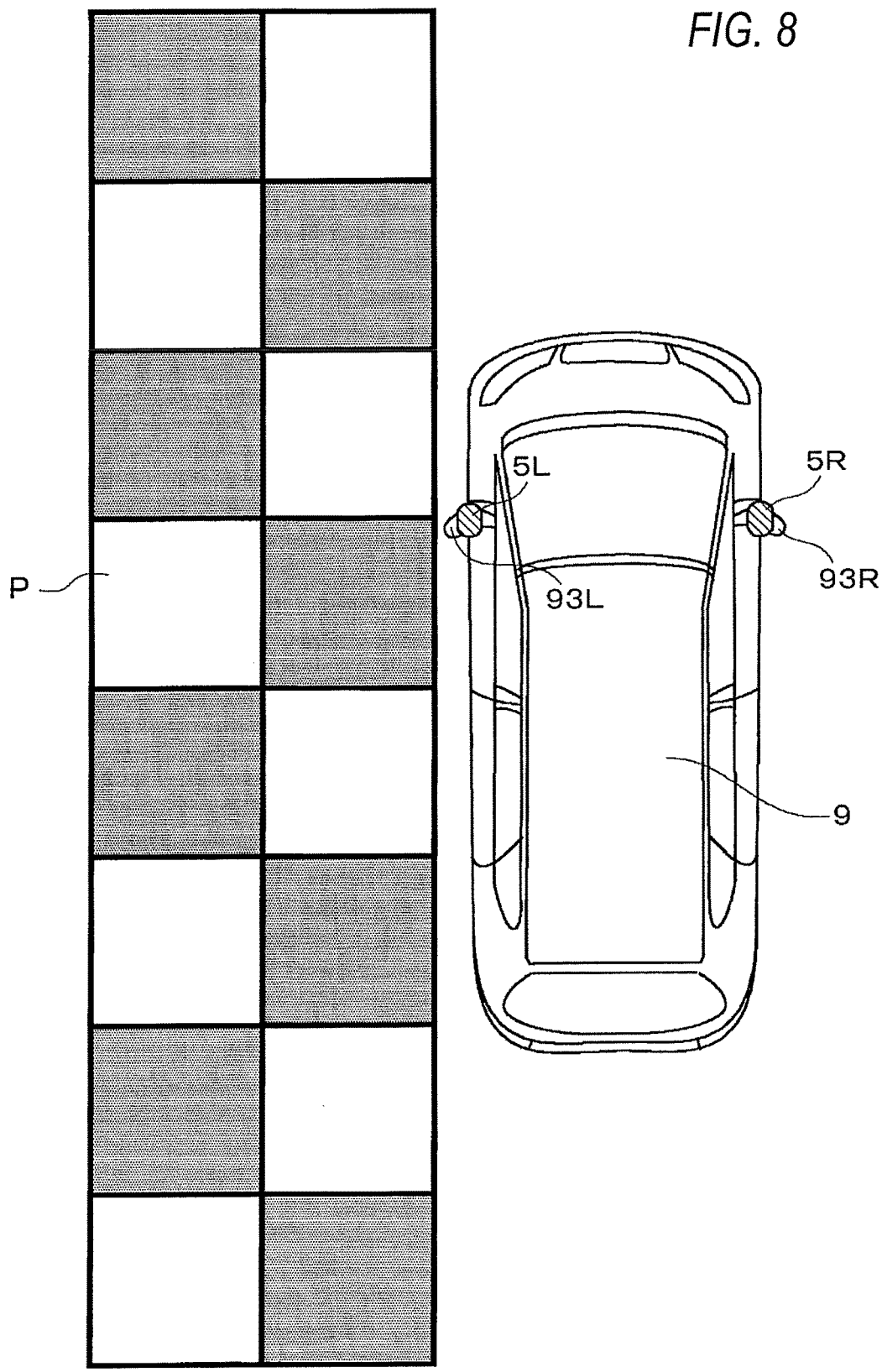
FIG. 8 illustrates a situation in which the captured image of FIG. 7 is acquired.

As shown in FIG. 8, the two captured images SL are acquired in a situation where a checked pattern P, in which squares of two colors are alternately arranged, is present on a left floor. The pattern P extends along a longitudinal direction of the vehicle 9 from a position in front of a front end of the vehicle 9 to a position at the rear of a rear end of the vehicle 9.

The two captured images SL shown in FIG. 7 include an image Pa of the pattern P. However, in the two captured images SL, directions and ranges of the image Pa of the pattern P are different. As shown in FIG. 7A, in the captured image SL acquired at the developed state of the left side mirror 93L, the image Pa of the pattern P extends along the substantially horizontal direction in the captured image SL. On the other hand, as shown in FIG. 7B, in the captured image SL acquired at the folded state of the left side mirror 93L, the image Pa of the pattern P extends with a right side thereof being inclined downwards in the captured image SL. In this example, the left side camera 5L has been described. However, the right side camera 5R is also the same.

In this way, when the developed/folded state of the side mirrors 93L, 93R is changed, the directions and ranges of the photographic subject images included in the captured images acquired by the side cameras 5L, 5R are changed. For this reason, at the folded state of the side mirrors 93L, 93R, if the composite image CP is generated in the same method as the developed state, the composite image CP in which the images of the photographic subjects are composed without being matched is generated.

In order to cope with the above problem, the image display system 10 of this illustrative embodiment is configured to change the target areas TA (i.e., the areas used for generation of the composite image CP) in the captured images acquired by the side cameras 5L, 5R, at the developed and folded states of the side mirrors 93L, 93R.

Figure 9:
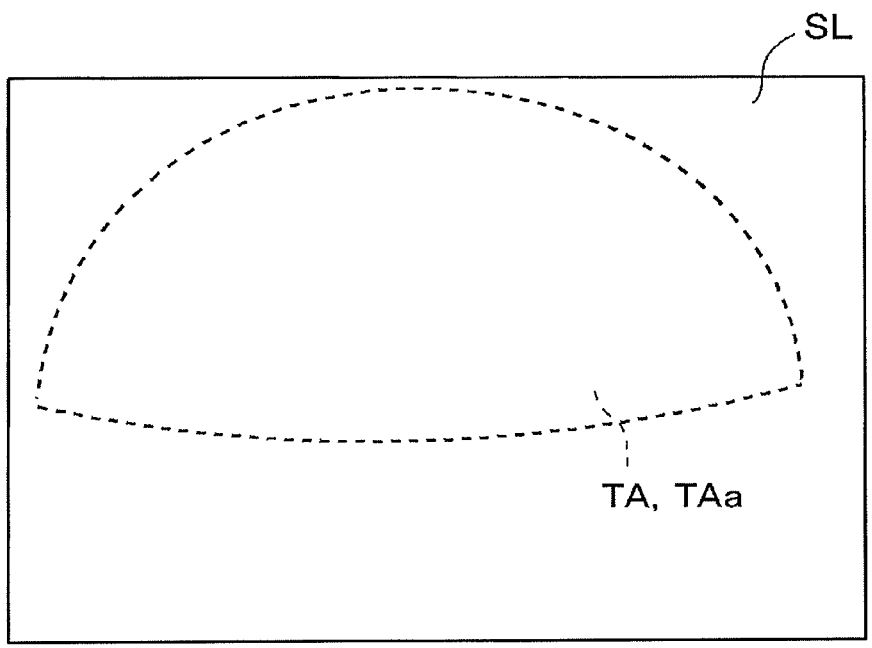
FIG. 9 illustrates target areas in the captured images acquired by the left side camera provided in the image display system of FIG. 1.
Figure 9:
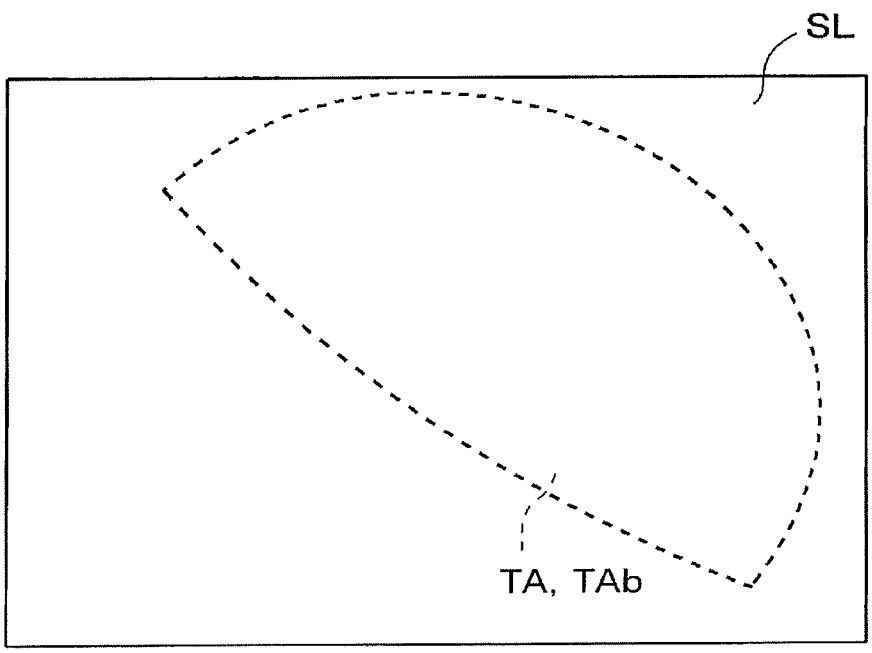

FIG. 9 shows the target area TA in the captured image SL of the left side camera 5L. FIG. 9A shows the target area TAa at the developed state of the left side mirror 93L. On the other hand, FIG. 9B shows the target area TAb at the folded state of the left side mirror 93L. In the two captured images SL, the target areas TA in the captured images SL are different from each other.

In this way, when the target areas TA in the captured images SL are changed at the developed and folded states of the left side mirror 93L, it is possible to set, as the target area TA, an area including the photographic subject image of the periphery of the vehicle 9 in the captured image SL, at any state. As a result, at any state, it is possible to generate the composite image CP in which the images of the photographic subjects are composed with being matched. Meanwhile, in this example, the left side camera 5L has been described. However, the target area TA in the captured image SR of the right side camera 5R is also changed in the same manner, depending on the state of the right side mirror 93R.

It is not possible to appropriately determine the target area TAb defined at the folded state of the side mirrors 93L, 93R even though a simple coordinate conversion (rotation, parallel shift and the like) is performed for the target area TAa defined at the developed state. The reason is as follows: although the positions of the side cameras 5L, 5R are changed as the state of the side mirrors 93L, 93R is shifted, a large distortion (a phenomenon that an image of the photographic subject is distorted) occurs in the captured image acquired through a wide angle lens such as a fish-eye lens. For this reason, the target area TAa defined at the developed state of the side mirrors 93L, 93R and the target area TAb defined at the folded state are individually determined in accordance with the correspondence tables 27b beforehand stored in the storage unit 27.

At the developed state of the side mirrors 93L, 93R, the image composition unit 22 of the image display system 10 is configured to use a 'table upon development' that is the correspondence table 27b corresponding to the developed state. The image composition unit 22 is configured to generate the composite image CP by using the target area TAa in the captured image determined by the table upon development. On the other hand, at the folded state of the side mirrors 93L, 93R, the image composition unit 22 is configured to use a 'table upon folding' that is the correspondence table 27b corresponding to the folded state. The image composition unit 22 is configured to generate the composite image CP by using the target area TAb in the captured image determined by the table upon folding.

In this way, the image composition unit 22 of the image display system 10 is configured to change the target area TA used for generation of the composite image CP, in accordance with the developed/folded state of the side mirrors 93L, 93R. Thereby, the image display system 10 can generate the composite image CP in which the images of the photographic subjects are composed with being matched, irrespective of the state of the side mirrors 93L, 93R.

<1-5. Display of Display Image>

Figure 10:
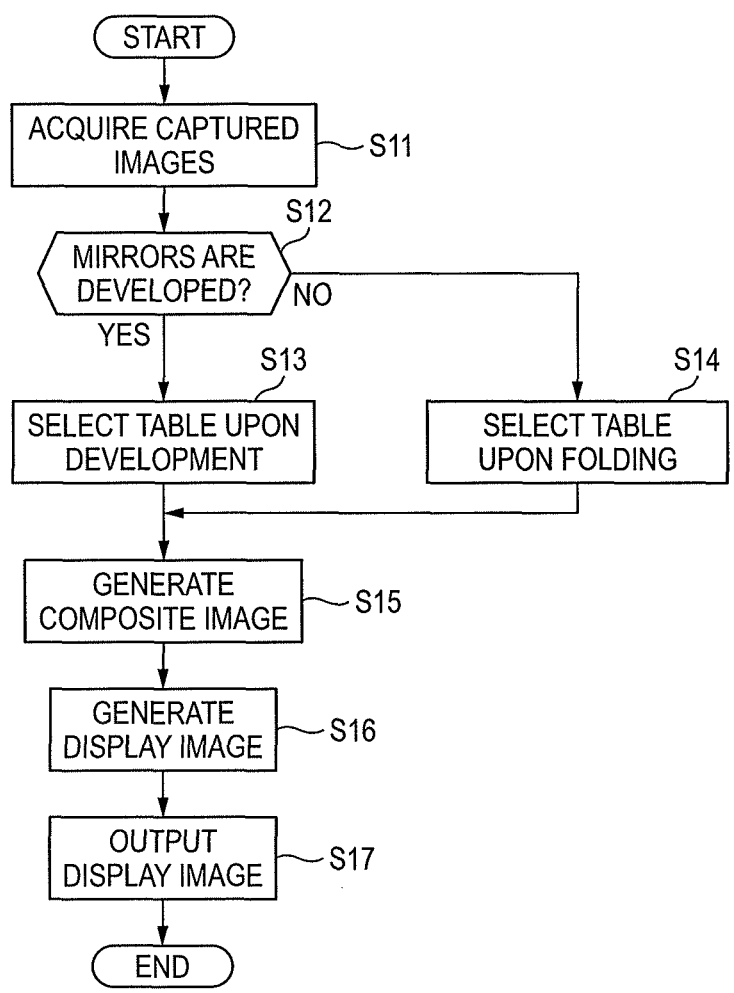
FIG. 10 shows a flow of operations of the image display system of FIG. 1.

Subsequently, a flow of operations of the image display system 10 is described. FIG. 10 shows a flow of operations of the image display system 10 for displaying the display image DP. The operations shown in FIG. 10 start when the user performs an operation to start the operations through the operation buttons 4. Also, the operations of FIG. 10 are repeatedly executed with a predetermined period (for example, a period of 1/30 second) until the user performs an operation to stop the operations through the operation buttons 4.

First, the four cameras 5 provided in the vehicle 9 are respectively enabled to capture the periphery of the vehicle 9. Then, the image acquisition unit 21 acquires the four captured images obtained through the four cameras 5 (step S11).

Then, the state acquisition unit 20b acquires the developed/folded state of the side mirrors 93L, 93R. The state acquisition unit 20b determines whether the side mirrors 93L, 93R are at the developed state or folded state, based on the signal transmitted from the mirror driving unit 92 configured to rotate the side mirrors 93L, 93R (step S12).

If the side mirrors 93L, 93R are at the developed state (Yes in step S12), the image composition unit 22 selects the table upon development, as the correspondence table used for generation of the composite image CP, under control of the image control unit 20a (step S13). Then, the image composition unit 22 reads out the table upon development, which is one of the plurality of correspondence tables 27b stored in the storage unit 27, from the storage unit 27.

Then, the image composition unit 22 uses the table upon development to generate the composite image CP indicating the periphery situation of the vehicle 9 viewed from the virtual view point (step S15). The image composition unit 22 determines the respective target areas TA of the four captured images on the basis of the table upon development. Then, the image composition unit 22 generates the composite image CP by using the respective target areas TA of the four captured images.

Subsequently, the image adjustment unit 23 generates the display image DP for display on the display apparatus 3 (step S16). The image adjustment unit 23 generates the display image DP by using the composite image CP generated by the image composition unit 22 and the captured images acquired by the image acquisition unit 21. The image adjustment unit 23 selects the captured image in accordance with the traveling direction of the vehicle 9 and uses the same for generation of the display image DP, under control of the image control unit 20a.

Then, the image output unit 24 outputs the display image DP generated by the image adjustment unit 23 to the display apparatus 3 (step S17). Then, the display image DP including the composite image CP is displayed on the display apparatus 3.

Also, if it is determined in step S12 that the side mirrors 93L, 93R are at the folded state (No in step S12), the image composition unit 22 selects the table upon folding, as the correspondence table used for generation of the composite image CP, under control of the image control unit 20a (step S14). Then, the image composition unit 22 reads out the table upon folding, which is one of the plurality of correspondence tables 27b stored in the storage unit 27, from the storage unit 27.

Then, the image composition unit 22 uses the table upon folding to generate the composite image CP indicating the periphery situation of the vehicle 9 viewed from the virtual view point (step S15). The image composition unit 22 determines the respective target areas TA of the four captured images on the basis of the table upon folding. Thereby, even when the side mirrors 93L, 93R are at the folded state, the areas including the images of the photographic subjects of the periphery of the vehicle 9 are determined as the target areas TA in the captured images of the side cameras SL, SR. Then, the image composition unit 22 generates the composite image CP by using the respective target areas TA of the four captured images. As a result, the composite image CP in which the images of the photographic subjects are composed with being matched is generated.

Subsequently, the image adjustment unit 23 generates the display image DP for display on the display apparatus 3 (step S16). The image adjustment unit 23 generates the display image DP by using the composite image CP generated by the image composition unit 22 and the captured images acquired by the image acquisition unit 21. The image adjustment unit 23 selects the captured image in accordance with the traveling direction of the vehicle 9 and uses the same for generation of the display image DP, under control of the image control unit 20*a*.

Then, the image output unit 24 outputs the display image DP generated by the image adjustment unit 23 to the display apparatus 3 (step S17). Then, the display image DP including the composite image CP is displayed on the display apparatus 3.

As described above, according to the image display system 10 of the first illustrative embodiment, the image acquisition unit 21 is configured to acquire the plurality of captured images obtained by the plurality of cameras 5 including the side cameras 5L, 5R provided in the side mirrors 93L, 93R of the vehicle 9 and the image composition unit 22 is configured to generate the composite image CP indicating the periphery of the vehicle 9 viewed from the virtual view point by using the respective target areas TA of the plurality of captured images. Also, the state acquisition unit 20*b* is configured to acquire the developed/folded state of the side mirrors 93L, 93R and the image composition unit 22 is configured to change the target areas TA in accordance with the developed/folded state of the side mirrors 93L, 93R. In this way, since the target areas TA in the captured images obtained by the side cameras 5L, 5R are changed in accordance with the state of the side mirrors 93L, 93R, it is possible to generate the composite image CP in which the images of the photographic subjects are composed with being matched, even when the side mirrors 93L, 93R are at any state of the developed state and the folded state.

<2. Second Illustrative Embodiment>
<2-1. Outline>

Subsequently, a second illustrative embodiment is described. Since configurations and operations of an image display system 10A according to the second illustrative embodiment are substantially the same as the image display system 10 of the first illustrative embodiment, differences from the first illustrative embodiment are mainly described below. The elements having the same or equivalent configurations or functions are denoted with the same reference numerals and the overlapping descriptions thereof are omitted. The image display system 10A is configured to generate the composite image CP by using an optical axis parameter indicating an error in the directions of the optical axes of the respective cameras 5 acquired in calibration processing.

When the cameras 5 are provided in the vehicle 9, a slight error (a mounting error) occurs between a direction of the optical axis of the camera 5 relative to the vehicle 9 and a design direction. Due to the error, a position of the image of the photographic subject included in the captured image acquired by the camera 5 deviates from a position assumed on the design. For this reason, if the composite image CP is generated using the target area TA in the captured image defined on the design, without considering the deviation, the images of the photographic subjects may be composed without being matched.

In particular, when generating the boundary part between the captured images in the composite image CP by blending the two captured images with the boundary part being interposed therebetween, if the images of the photographic subjects are composed without being matched, an image of the same object may appear at different positions in the blended part of the composite image CP. The user who visually recognizes the composite image CP may misunderstand a number or positions of the objects present at the periphery of the vehicle 9.

For this reason, the image display system 10A is configured to execute calibration processing, thereby acquiring an optical axis parameter relating to an actual direction of the optical axis of each camera 5. The optical axis parameter indicates an error between a direction of the optical axis of the camera 5 relative to the vehicle 9 and a design direction, and includes a roll angle, a tilt angle, a pan angle and the like, for example. The image display system 10A is configured to use the acquired optical axis parameter, thereby correcting a position of the target area TA in the captured image, which is used for generation of the composite image CP. Thereby, the image display system 10A can generate the composite image CP in which the error is considered.

Also, the side cameras 5L, 5R are changed as regards the positions and direction of optical axes thereof as the side mirrors 93L, 93R are rotated. As for the rotation of the side mirrors 93L, 93R, there is also an individual difference as regards a rotation angle and the like. For this reason, regarding the directions of the optical axes of the side cameras 5L, 5R, an independent error occurs at the developed and folded states of the side mirrors 93L, 93R, respectively. Therefore, the image display system 10A is configured to acquire the optical axis parameters indicating the error in the directions of the optical axes of the side cameras 5L, 5R, at each state of the actually developed state and actually folded state of the side mirrors 93L, 93R.

The image generation apparatus 2 of the image display system 10A has a function of deriving the optical axis parameter in the calibration processing. For this reason, it can be said that the image generation apparatus 2 is a parameter acquisition apparatus configured to acquire parameters relating to the cameras 5 provided in the vehicle 9. When the plurality of cameras 5 is attached to the vehicle 9 at a vehicle factory or vehicle repair station, the image display system 10A executes the calibration processing. The optical axis parameters obtained in the calibration processing are stored in the image generation apparatus 2. The optical axis parameters are used when the image generation apparatus 2 generates the composite image CP.

Figure 11:
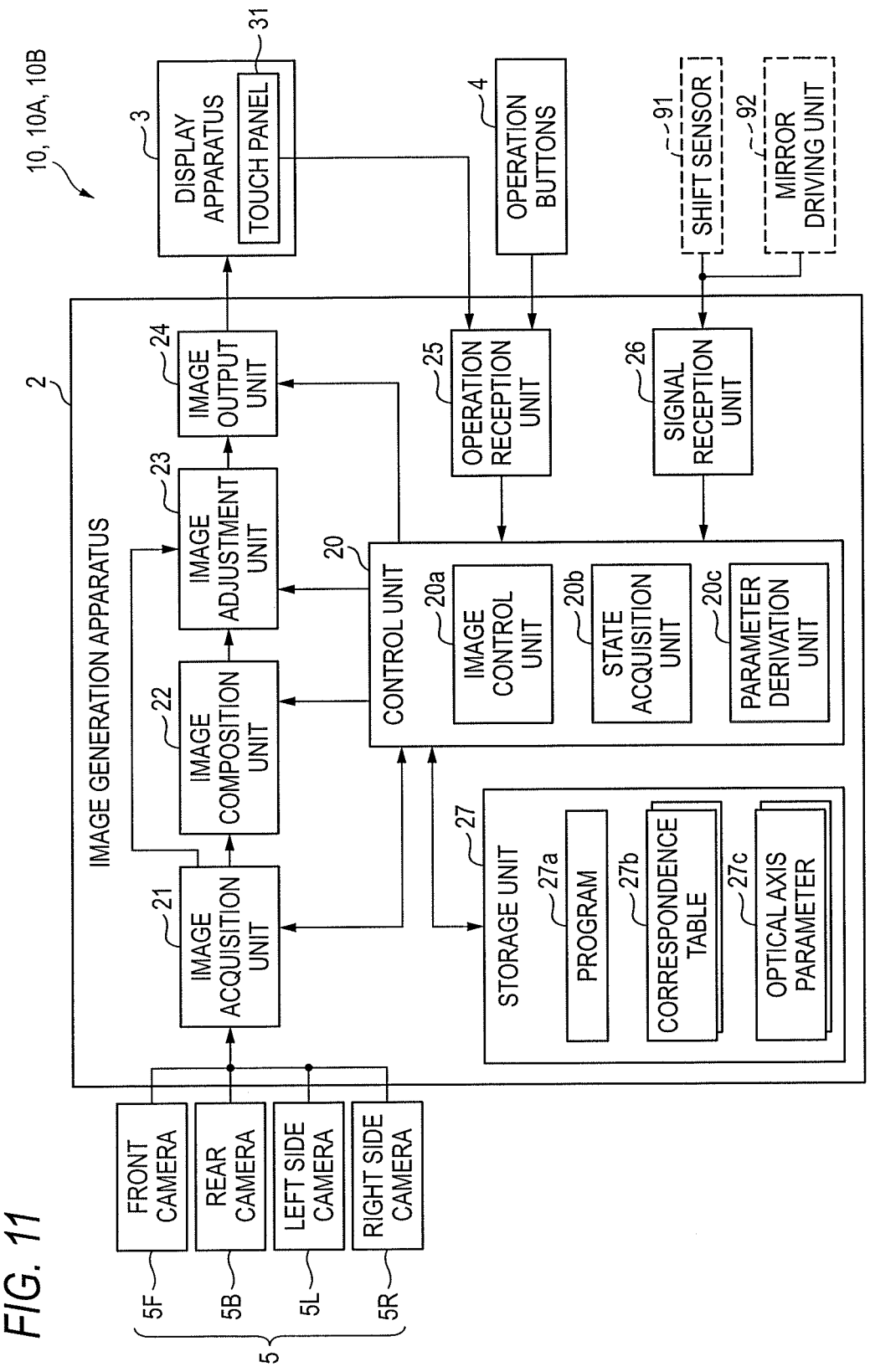
FIG. 11 illustrates a configuration of an image display system according to a second illustrative embodiment.

As shown in FIG. 11, the image display system 10A further has a parameter derivation unit 20*c* configured to derive the optical axis parameters, in addition to the configurations of the first illustrative embodiment shown in FIG. 1. The parameter derivation unit 20*c* is a part of the functional units that are implemented as the CPU of the control unit 20 performs the calculation processing in response to the program 27*a*.

Also, the storage unit 27 is configured to store therein a plurality of optical axis parameters 27*c*, together with the program 27*a* and the plurality of correspondence tables 27*b*. Since the optical axis parameters 27*c* are acquired by the calibration processing, the optical axis parameters are not stored in the storage unit 27 before the calibration processing is executed.

The optical axis parameter 27*c* is provided in each of the cameras 5. Also, regarding the side cameras 5L, 5R, the optical axis parameter 27*c* is individually provided in each state of the developed and folded states of the side mirrors 93L, 93R.

<2-2. Calibration Processing>

Figure 12:
FIG. 12 illustrates a situation of a vehicle when the image display system of FIG. 11 executes calibration processing.
Figure 12:
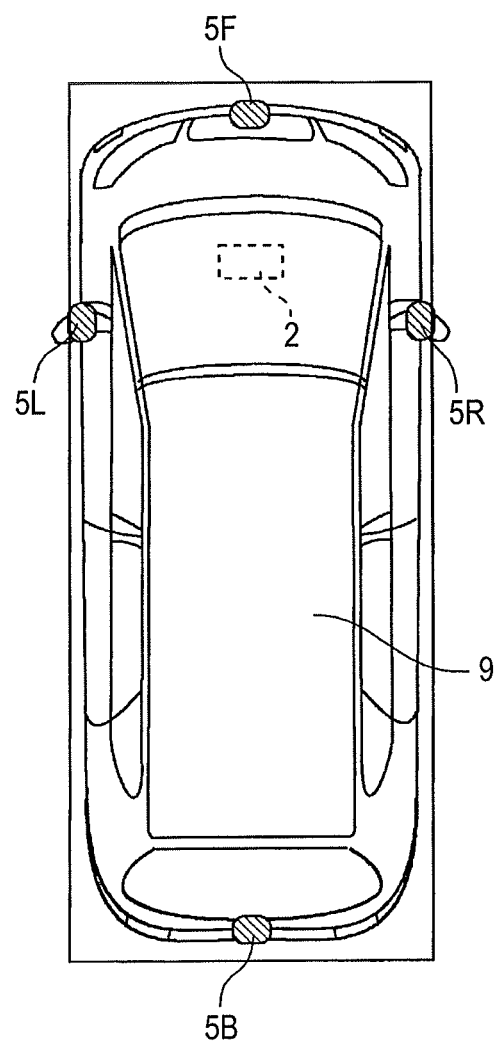
Figure 12:

FIG. 12 illustrates a situation of the vehicle 9 when the calibration processing is executed. As shown in FIG. 12, four marking members 7 are arranged at a workplace for executing the calibration processing, such as a vehicle factory and a vehicle repair station.

Figure 13:
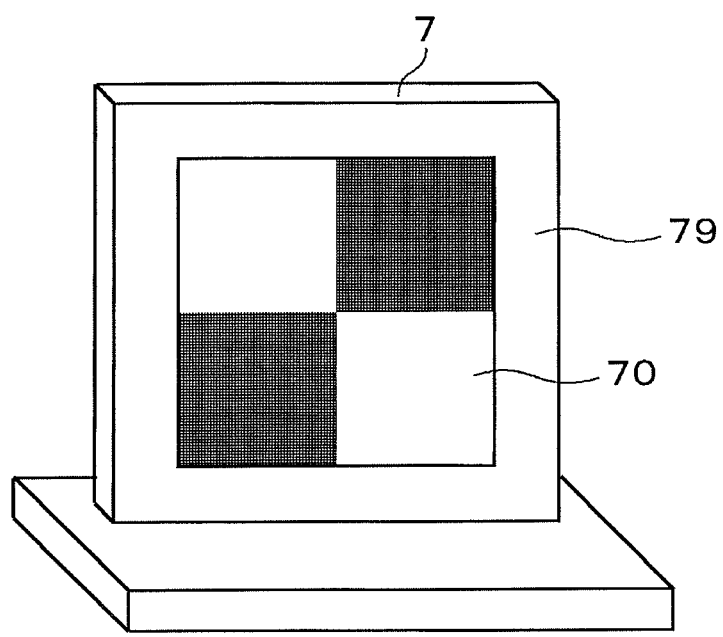
FIG. 13 illustrates an outward appearance of a marking member used for the calibration processing.

As shown in FIG. 13, each of the four marking members 7 has an erectable cubic shape. The marking member 7 has an erected plate-shaped member 79 such as a plastic plate. A main surface of the plate-shaped member 79, which faces the vehicle 9, is formed with a mark 70 having a predetermined pattern. The pattern of the mark 70 is a checked pattern, for example. One of two colors forming the pattern is a dark color (for example, black) and the other is a relatively bright color (for example, white).

When executing the calibration processing, as shown in FIG. 12, the vehicle 9 is stopped at a predetermined position in the workplace by using a confrontation apparatus and the like. Thereby, the relative positions of the four marking members 7 to the vehicle 9 are constant. The four marking members 7 are respectively arranged in respective areas A1, A2, A3, A4 of a left front, a right front, a left rear and a right rear of the vehicle 9. Therefore, all the four marking members 7 can be overlappingly captured by the two cameras 5 of the four cameras 5 (refer to FIG. 2).

The calibration processing is executed as an operator performs a predetermined operation through the touch panel 31 and the like, at the state shown in FIG. 12. In the calibration processing, the cameras 5 mounted to the vehicle 9 capture the periphery of the vehicle 9 including the marking members 7 to acquire the captured images. The image generation apparatus 2 acquires the optical axis parameters indicating the errors in the directions of the optical axes of the cameras 5, based on the captured images acquired in this way.

Figure 14:
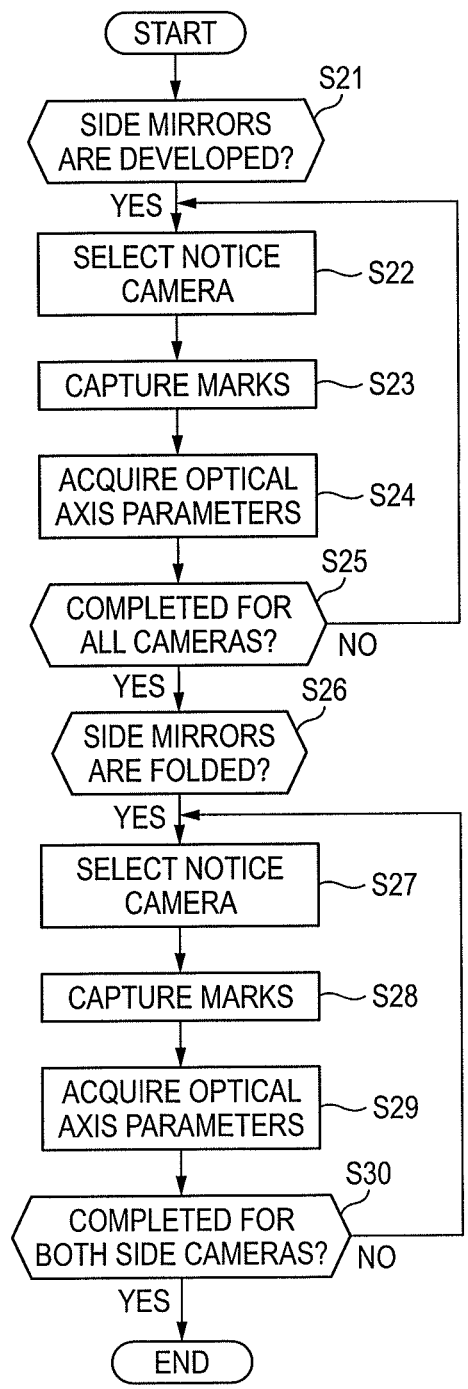
FIG. 14 shows a flow of the calibration processing.

FIG. 14 shows a flow of the calibration processing of the image display system 10A. In the calibration processing, the optical axis parameters are acquired at each state of the actually developed state and actually folded state of the side mirrors 93L, 93R.

First, the state acquisition unit 20b of the image generation apparatus 2 acquires the developed or folded state of the side mirrors 93L, 93R and confirms whether the side mirrors 93L, 93R are at the actually developed state (step S21). At this time, if the side mirrors 93L, 93R are at the folded state, the image display system 10A stands by until the side mirrors 93L, 93R are actually developed.

On the other hand, if the side mirrors 93L, 93R are at the folded state, the display apparatus 3 may display a warning and the like to urge the user to develop the side mirrors 93L, 93R. Also, if the side mirrors 93L, 93R are at the folded state, the control unit 20 of the image generation apparatus 2 may transmit a predetermines signal to the mirror driving unit 92 to automatically shift the side mirrors 93L, 93R to the developed state.

If the side mirrors 93L, 93R are at the actually developed state (Yes in step S21), the parameter derivation unit 20c selects one camera 5 of the four cameras 5, as a 'notice camera', which is a processing target (step S22).

Figure 15:
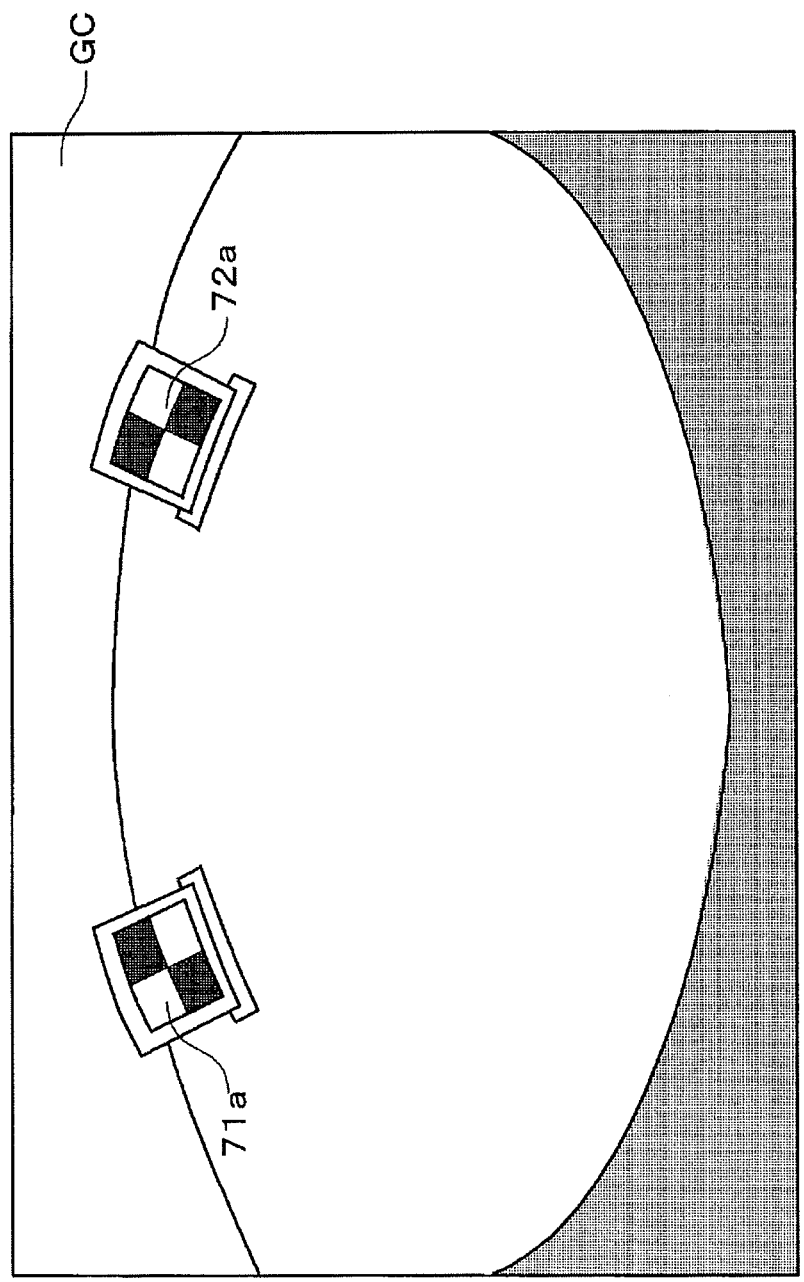
FIG. 15 illustrates an example of a captured image for the calibration processing.

Subsequently, the notice camera 5 captures a periphery area of the vehicle 9 including the marks 70 of the two marking members 7 to acquire a captured image (step S23). FIG. 15 illustrates an example of a captured image GC for calibration processing obtained in this way. As shown, the captured image GC includes images (hereinafter, referred to as 'mark images') 71a, 72a of the two marks 70.

Then, as shown in FIG. 14, the parameter derivation unit 20c acquires an optical axis parameter indicating an error in the direction of the optical axis of the notice camera 5, based on the captured image GC (step S24). The parameter derivation unit 20c first specifies positions of the two mark images 71a, 72a included in the captured image GC, and derives the optical axis parameter such as a pan angle, a tilt angle and a roll angle, based on the positions.

The parameter derivation unit 20c specifies the positions of the two mark images 71a, 72a in the captured image GC by using a well known corner detection method such as a Harris operator. Also, the parameter derivation unit 20c derives a pan angle on the basis of left and right positions of the two mark images 71a, 72a in the captured image GC, a tilt angle on the basis of upper and lower positions of the two mark images 71a, 72a and a roll angle on the basis of a difference between heights of the two mark images 71a, 72a in the captured image GC, respectively. In the meantime, the positions of the two mark images 71a, 72a in the captured image GC may be designated manually by an operator.

The parameter derivation unit 20c associates the acquired optical axis parameter with the notice camera 5 and stores the same in the storage unit 27.

Then, the parameter derivation unit 20c determines whether the optical axis parameters are acquired for all the four cameras 5 (step S25). If there is the camera 5 for which the optical axis parameter has not been acquired yet (No in step S25), another camera 5, which has not been set as the notice camera 5, is set as the new notice camera 5 and the above described processing is repeated.

The processing is repeated, so that all the optical axis parameters of the four cameras 5 are acquired and stored in the storage unit 27. The optical axis parameters of the two side cameras 5L, 5R acquired in the processing are optical axis parameters acquired at the actually developed state of the side mirrors 93L, 93R and are hereinafter referred to as 'parameters upon development'. The 'parameters upon development' indicate errors in the directions of the optical axes of the side cameras 5L, 5R with respect to the design directions, at the actually developed state of the side mirrors 93L, 93R.

In this way, when the optical axis parameters of the four cameras 5 are acquired (Yes in step S25), the state acquisition unit 20b acquires the developed or folded state of the side mirrors 93L, 93R. Then, the image display system 10A stands by until the side mirrors 93L, 93R are actually folded (step S26).

In the meantime, at this time, the display apparatus 3 may display a warning and the like to urge the user to fold the side mirrors 93L, 93R. Also, the control unit 20 of the image generation apparatus 2 may transmit a predetermines signal to the mirror driving unit 92 to automatically shift the side mirrors 93L, 93R to the folded state.

When the side mirrors 93L, 93R are at the actually folded state (Yes in step S26), the parameter derivation unit 20c selects one of the two left and right side cameras 5L, 5R, as a 'notice camera' that is a processing target (step S27).

Subsequently, the notice camera 5 captures a periphery area of the vehicle 9 including the marks 70 of the two marking members 7 to acquire a captured image (step S28). The acquired captured image GC also includes the two mark images 71a, 72a.

Then, the parameter derivation unit 20c acquires an optical axis parameter indicating an error in the direction of the optical axis of the notice camera 5, based on the captured image GC (step S29). The parameter derivation unit 20c specifies the positions of the two mark images 71a, 72a included in the captured image GC, and derives the optical axis parameter, based on the positions. The parameter derivation unit 20c associates the acquired optical axis parameter with the notice camera 5 and stores the same in the storage unit 27.

Then, the parameter derivation unit 20c determines whether the optical axis parameters are acquired for the two left and right side cameras 5L, 5R (step S30). If there is the side camera 5 for which the optical axis parameter has not been acquired yet (No in step S30), another camera 5, which has not been set as the notice camera 5, is set as the new notice camera 5 and the above described processing is repeated.

By the above processing, the optical axis parameters of the two left and right side cameras 5L, 5R are acquired and stored in the storage unit 27. The optical axis parameters of the two side cameras 5L, 5R acquired in the processing are optical axis parameters acquired at the actually folded state of the side mirrors 93L, 93R and are hereinafter referred to as 'parameters upon folding'. The 'parameters upon folding' indicate errors in the directions of the optical axes of the side cameras 5L, 5R with respect to the design directions, at the actually folded state of the side mirrors 93L, 93R.

By the above calibration processing, both the 'parameters upon development' and the 'parameters upon folding' are acquired for the two side cameras 5L, 5R.

<2-3. Display of Display Image>

Figure 16:
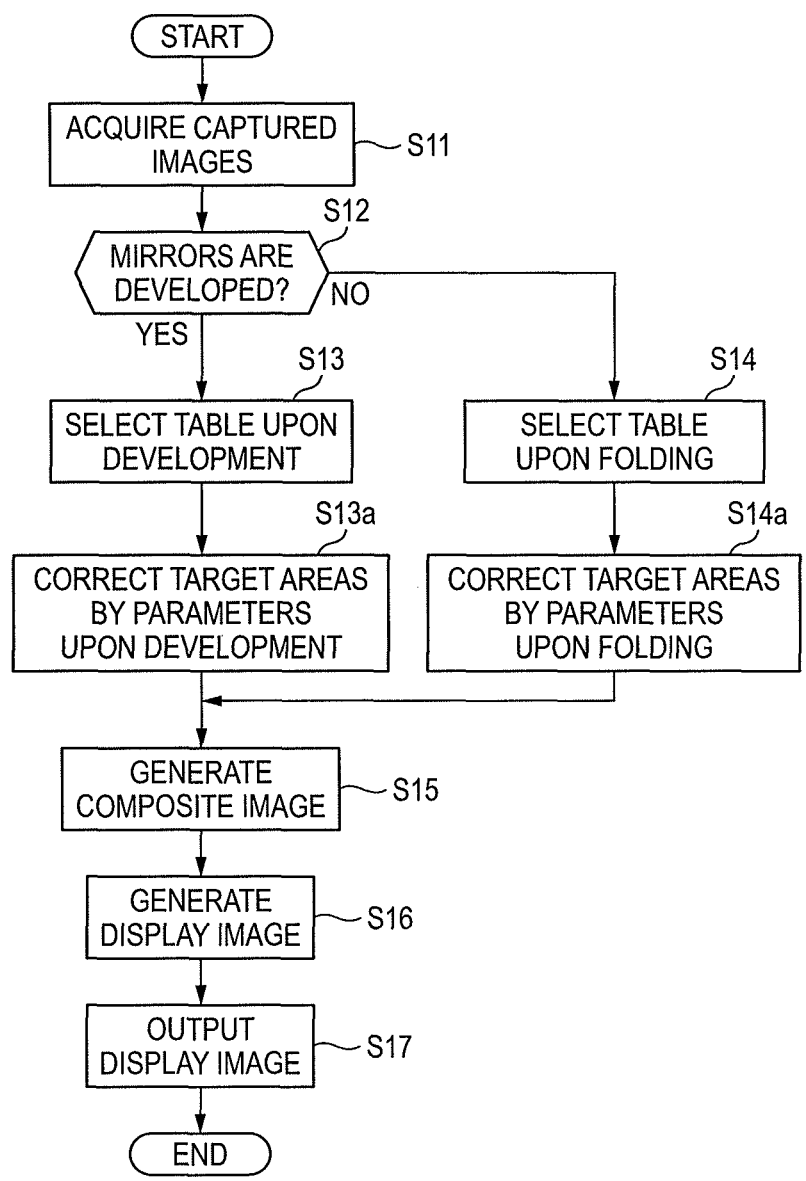
FIG. 16 shows a flow of operations of the image display system of FIG. 11.

The optical axis parameters acquired in the above manner are used for generation of the composite image CP. FIG. 16 shows a flow of operations of the image display system 10A for displaying the display image DP in the second illustrative embodiment. The operations shown in FIG. 16 correspond to the operations of the first illustrative embodiment shown in FIG. 10 to which step S13a is added after step S13 and step S14a is added after step S14.

First, the image acquisition unit 21 acquires the four captured images obtained by the four cameras 5 (step S11). Then, the state acquisition unit 20b acquires the developed or folded state of the side mirrors 93L, 93R (step S12).

If the side mirrors 93L, 93R are at the developed state (Yes in step S12), the image composition unit 22 selects the table upon development, as the correspondence table used for generation of the composite image CP, and reads out the table upon development from the storage unit 27 (step S13).

Then, the image composition unit 22 corrects the respective target areas TA of the four captured images defined on the basis of the table upon development, considering the errors in the directions of the optical axes of the four cameras 5 (step S13a). The image composition unit 22 reads out the optical axis parameters 27c of the four cameras 5 from the storage unit 27. At this time, the image composition unit 22 reads out the 'parameters upon development' from the storage unit 27 with respect to the two side cameras 5L, 5R. Then, the image composition unit 22 corrects the respective target areas TA of the four captured images defined on the basis of the table upon development by using the respective optical axis parameters 27c of the four cameras 5. Thereby, the target areas TA in the captured images of the side cameras 5L, 5R are corrected using the 'parameters upon development' of the side cameras 5L, 5R.

Figure 17:
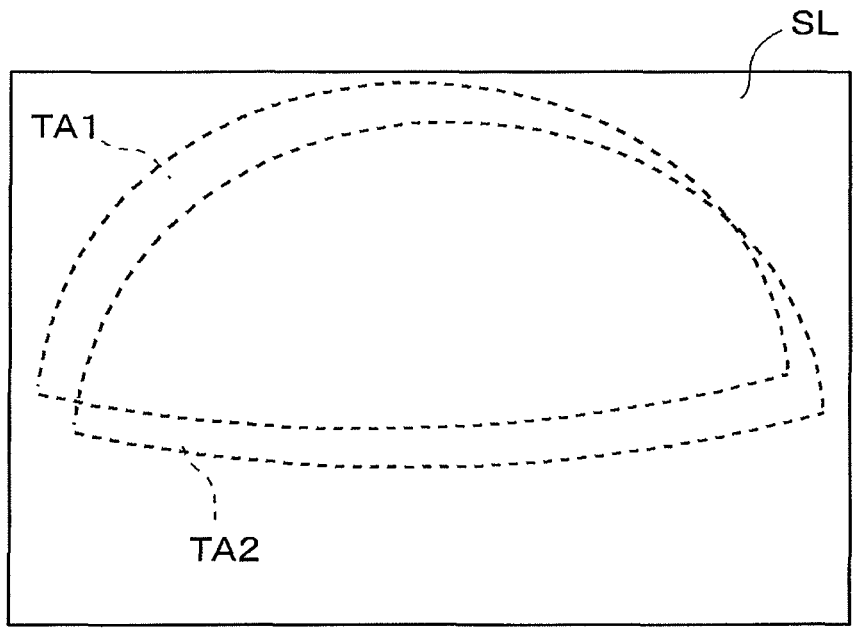
FIG. 17 illustrates target areas in the captured images acquired by the left side camera provided in the image display system of FIG. 11.

FIG. 17 illustrates an example of the target area TA in the captured image SL of the left side camera 5L at the developed state of the left side mirror 93L. If there is no error in the direction of the optical axis of the left side camera 5L, the target area TA used for generation of the composite image CP is an initial area TA1 based on only the table upon development. The image composition unit 22 corrects the target area TA from the initial area TA1 to a corrected area TA2 by using the parameter upon development indicating the error in the direction of the optical axis of the left side camera 5L at the actually developed state of the left side mirror 93L.

Subsequently, as shown in FIG. 16, the image composition unit 22 generates the composite image CP by using the respective corrected target areas TA of the four captured images (step S15). Thereby, since the composite image CP is generated considering the errors in the directions of the optical axes of the four cameras 5, the composite image CP in which the images of the photographic subjects are composed with being matched is generated. The images of the photographic subjects can also be appropriately superimposed at the boundary part between the captured images in the composite image CP, which is generated by blending the two captured images.

Subsequently, the image adjustment unit 23 generates the display image DP for display on the display apparatus 3 (step S16), and the image output unit 24 outputs the display image DP generated by the image adjustment unit 23 to the display apparatus 3 (step S17). Thereby, the display image DP including the composite image CP is displayed on the display apparatus 3.

Also, if it is determined in step S12 that the side mirrors 93L, 93R are at the folded state (No in step S12), the image composition unit 22 reads out the table upon folding from the storage unit 27, as the correspondence table used for generation of the composite image CP (step S14).

Then, the image composition unit 22 corrects the respective target areas TA of the four captured images defined on the basis of the table upon folding, considering the errors in the directions of the optical axes of the four cameras 5 (step S14a). The image composition unit 22 reads out the optical axis parameters 27c of the four cameras 5 from the storage unit 27. At this time, the image composition unit 22 reads out the 'parameters upon folding' from the storage unit 27 with respect to the two side cameras 5L, 5R. Then, the image composition unit 22 corrects the respective target areas TA of the four captured images defined on the basis of the table upon folding by using the respective optical axis parameters 27c of the four cameras 5. Thereby, the target areas TA in the captured images of the side cameras 5L, 5R are corrected using the 'parameters upon folding' of the side cameras 5L, 5R.

Figure 18:
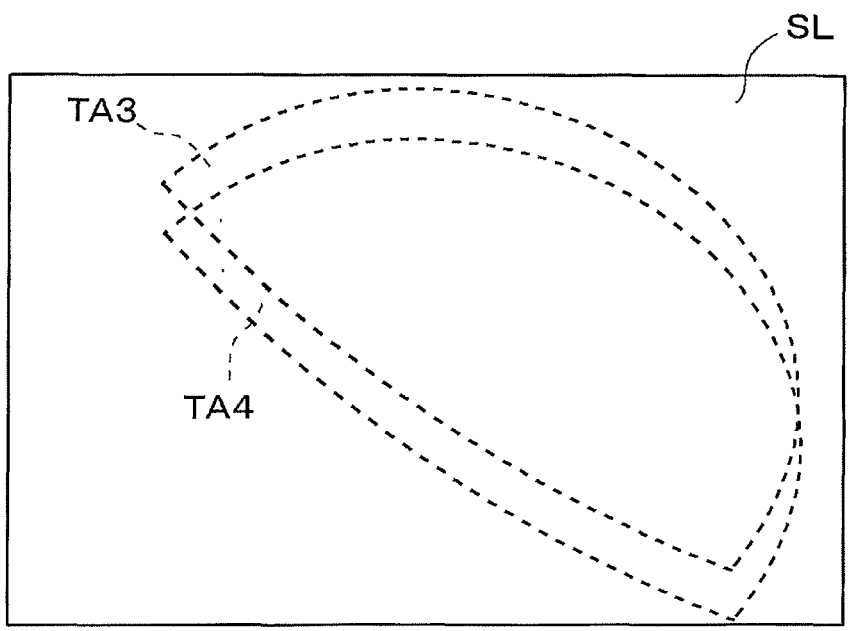
FIG. 18 illustrates target areas in the captured images acquired by the left side camera provided in the image display system of FIG. 11.

FIG. 18 illustrates an example of the target area TA in the captured image SL of the left side camera 5L at the folded state of the left side mirror 93L. If there is no error in the direction of the optical axis of the left side camera 5L, the target area TA used for generation of the composite image CP is an initial area TA3 based on only the table upon folding. The image composition unit 22 corrects the target area TA from the initial area TA3 to a corrected area TA4 by using the parameter upon folding indicating the error in the direction of the optical axis of the left side camera 5L at the actually folded state of the left side mirror 93L.

Subsequently, as shown in FIG. 16, the image composition unit 22 generates the composite image CP by using the respective corrected target areas TA of the four captured images (step S15). Thereby, since the composite image CP is generated considering the errors in the directions of the optical axes of the four cameras 5, the composite image CP in which the images of the photographic subjects are composed with being matched is generated. The images of the photographic subjects can also be appropriately superimposed at the boundary part between the captured images in the composite image CP, which is generated by blending the two captured images.

Subsequently, the image adjustment unit 23 generates the display image DP for display on the display apparatus 3 (step S16), and the image output unit 24 outputs the display image DP generated by the image adjustment unit 23 to the display apparatus 3 (step S17). Thereby, the display image DP including the composite image CP is displayed on the display apparatus 3.

As described above, according to the image display system 10A of the second illustrative embodiment, the image composition unit 22 is configured to generate the composite image CP by using the target areas TA based on the parameters upon development at the developed state of the side mirrors 93L, 93R. Also, the image composition unit 22 is configured to generate the composite image CP by using the target areas TA based on the parameters upon folding at the folded state of the side mirrors 93L, 93R. The parameters upon development indicate the errors in the directions of the optical axes of the side cameras 5L, 5R at the actually developed state of the side mirrors 93L, 93R. On the other hand, the parameters upon folding indicate the errors in the directions of the optical axes of the side cameras 5L, 5R at the actually folded state of the side mirrors 93L, 93R.

In this way, the image composition unit 22 is configured to generate the composite image CP by using the target areas TA based on the errors in the directions of the optical axes at each state of the developed and folded states of the side mirrors 93L, 93R. For this reason, it is possible to generate the composite image CP in which the images of the photographic subjects are appropriately arranged, irrespective of the state of the side mirrors 93L, 93R. Also, even when generating the boundary part between the captured images in the composite image CP by blending the two captured images, it is possible to appropriately superimpose the images of the photographic subjects each other at the blended part of the composite image CP.

Also, in the calibration processing, the parameter derivation unit 20c is configured to acquire the parameters upon development at the actually developed state of the side mirrors 93L, 93R and to acquire the parameters upon folding at the actually folded state of the side mirrors 93L, 93R. For this reason, it is possible to appropriately acquire the parameters upon development and the parameters upon folding necessary for generation of the appropriate composite image CP at each state of the developed and folded states of the side mirrors 93L, 93R.

<3. Third Illustrative Embodiment>

Subsequently, a third illustrative embodiment is described. Since configurations and operations of an image display system 10B according to the third illustrative embodiment are substantially the same as the image display system 10A of the second illustrative embodiment, differences from the second illustrative embodiment are mainly described below. The elements having the same or equivalent configurations or functions are denoted with the same reference numerals and the overlapping descriptions thereof are omitted.

The image display system 10A of the second illustrative embodiment is configured to acquire the optical axis parameters at each state of the developed and folded states of the side mirrors 93L, 93R, in the calibration processing. In order to generate the appropriate composite image CP, it is preferable to acquire the optical axis parameters at both states. However, it takes relatively much time to execute the calibration processing.

For this reason, an image display system 10B of the third illustrative embodiment is configured to acquire the optical axis parameters (the parameters upon development) only at the developed state of the side mirrors 93L, 93R, thereby shortening the time necessary for the calibration processing. The image display system 10B of the third illustrative embodiment is configured to derive the parameters upon folding by a predetermined calculation on the basis of the acquired parameters upon development.

As previously described, regarding the directions of the optical axes of the side cameras 5L, 5R, the independent errors respectively occur at the developed and folded states of the side mirrors 93L, 93R. For this reason, when the parameters upon folding are derived by the calculation, it is difficult to acquire the parameters upon folding correctly indicating the errors in the directions of the optical axes. Therefore, when the parameters upon folding derived by the calculation are used to generate the composite image CP, there is a possibility that the images of the photographic subjects will be composed without being matched.

In particular, when generating the boundary part between the captured images in the composite image CP by blending the two captured images with the boundary part being interposed therebetween, if the images of the photographic subjects are composed without being matched, an image of the same object may appear at different positions in the blended part of the composite image CP. The user who visually recognizes the composite image CP may misunderstand a number or positions of the objects present at the periphery of the vehicle 9.

For this reason, the image display system 10B of the third illustrative embodiment is configured to generate the boundary part between the captured images in the composite image CP by blending the two captured images with the boundary part being interposed therebetween at the developed state (when the parameters upon development acquired in the calibration processing are used) of the side mirror 93L, like the second illustrative embodiment. On the other hand, at the folded state (when the parameters upon folding derived by the calculation are used) of the side mirror 93L, the image display system 10B is configured to set the boundary part between the captured images in the composite image CP, as a line for which the captured images are not used.

The configuration of the image display system 10B of the third illustrative embodiment is the same as the image display system 10A of the second illustrative embodiment shown in FIG. 11. However, the parameter derivation unit 20c is configured to acquire the optical axis parameters (the parameters upon development) only at the developed state of the side mirrors 93L, 93R, in the calibration processing. Also, the parameter derivation unit 20c is configured to derive the parameters upon folding by a predetermined calculation on the basis of the acquired parameters upon development. The calculation equation is determined in advance by design values and is stored in the storage unit 27.

Also, in the third illustrative embodiment, a flow of operations of the image display system 10 for displaying the display image DP is the same as the operations shown in FIG. 16. However, when the image composition unit 22 generates the composite image CP in step S15, the method of generating the boundary part between the captured images in the composite image CP is different at the developed and folded states of the side mirrors 93L, 93R.

At the developed state of the side mirrors 93L, 93R, the image composition unit 22 is configured to generate the boundary part between the captured images in the composite image CP by blending the two captured images with the boundary part being interposed therebetween, like the above described illustrative embodiments (refer to FIG. 4).

Figure 19:
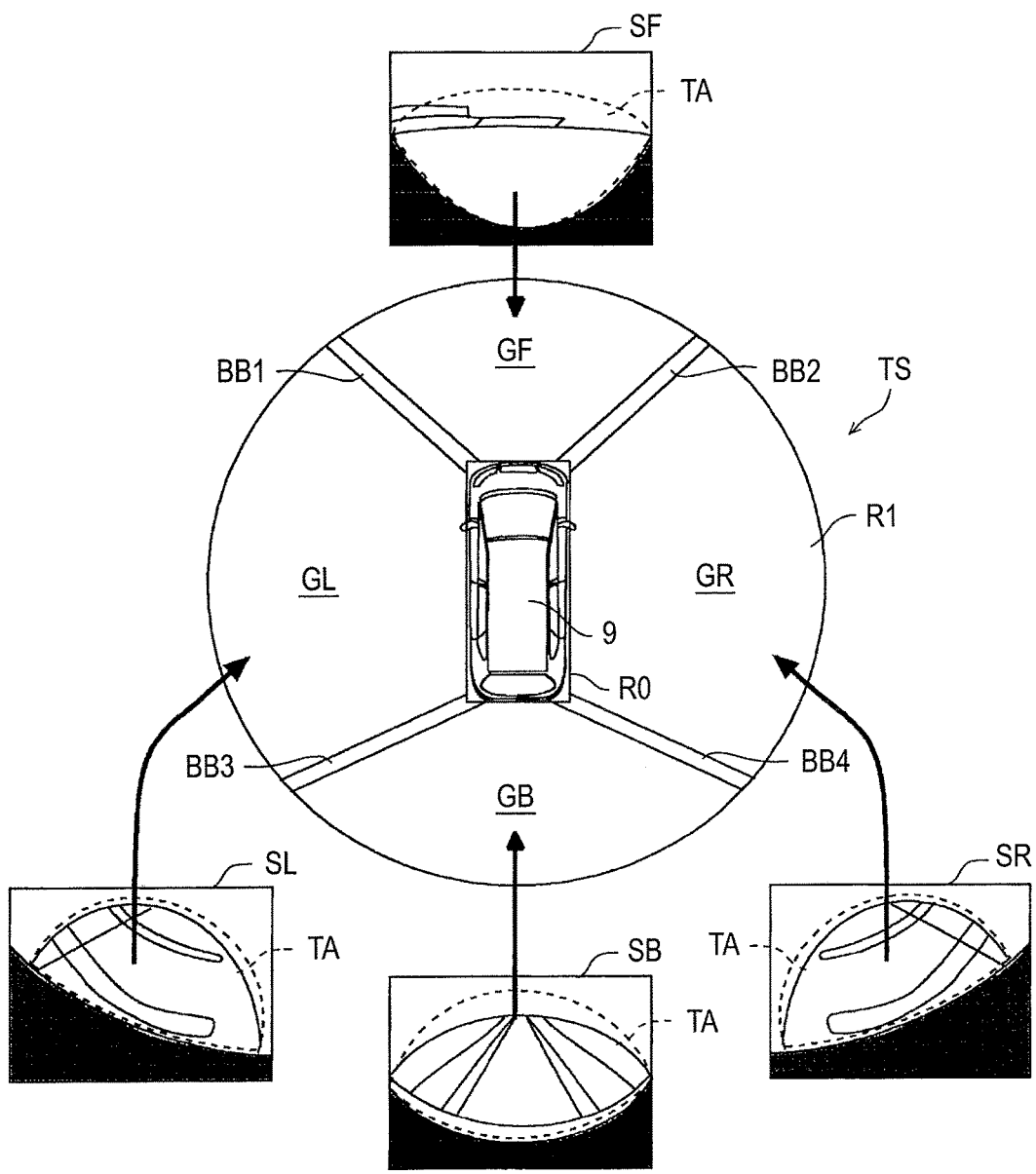
FIG. 19 illustrates a corresponding relation between parts of a stereoscopic curved surface and captured images when an image display system according to a third illustrative embodiment generates a composite image.

In contrast, at the folded state of the side mirrors 93L, 93R, the image composition unit 22 does not generate the boundary part between the captured images in the composite image CP by blending the captured images. In this case, as shown in FIG. 19, the parts GF, GB, GL, GR to which the four captured images are projected in the projection area R1 of the stereoscopic curved surface TS are divided at a predetermined interval without overlapping. For this reason, boundary parts BB1 to BB4 between the parts GF, GB, GL, GR are formed with gaps to which any captured image data is not projected. Therefore, the image composition unit 22 displays the boundary parts between the captured images in the composite image CP, as lines (an example of a mask image) for which the captured images are not used.

Figure 20:
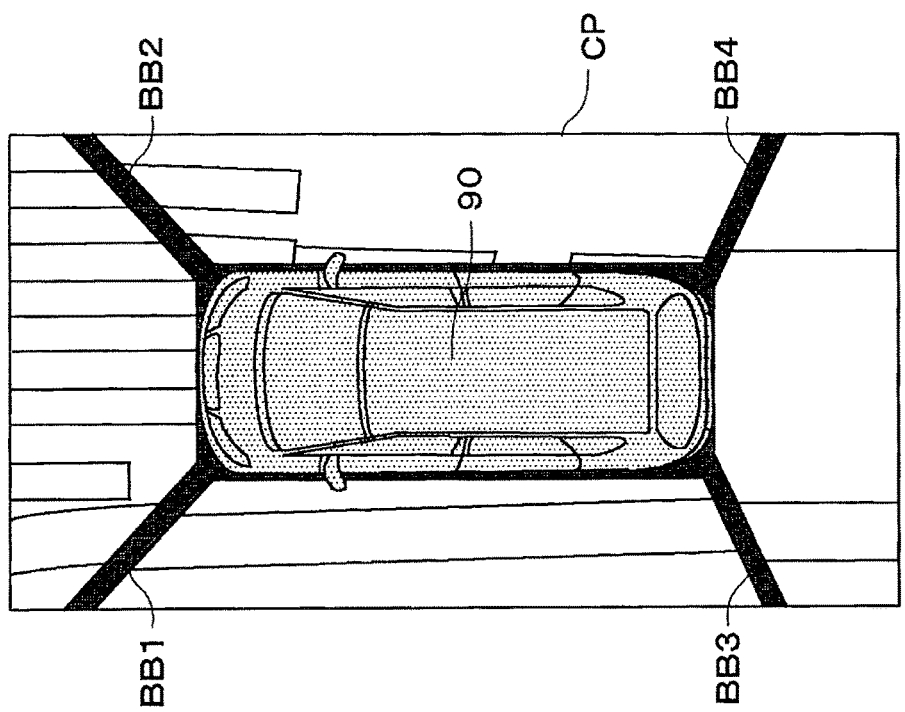
FIG. 20 illustrates examples of a composite image generated by the image display system according to the third illustrative embodiment.
Figure 20:
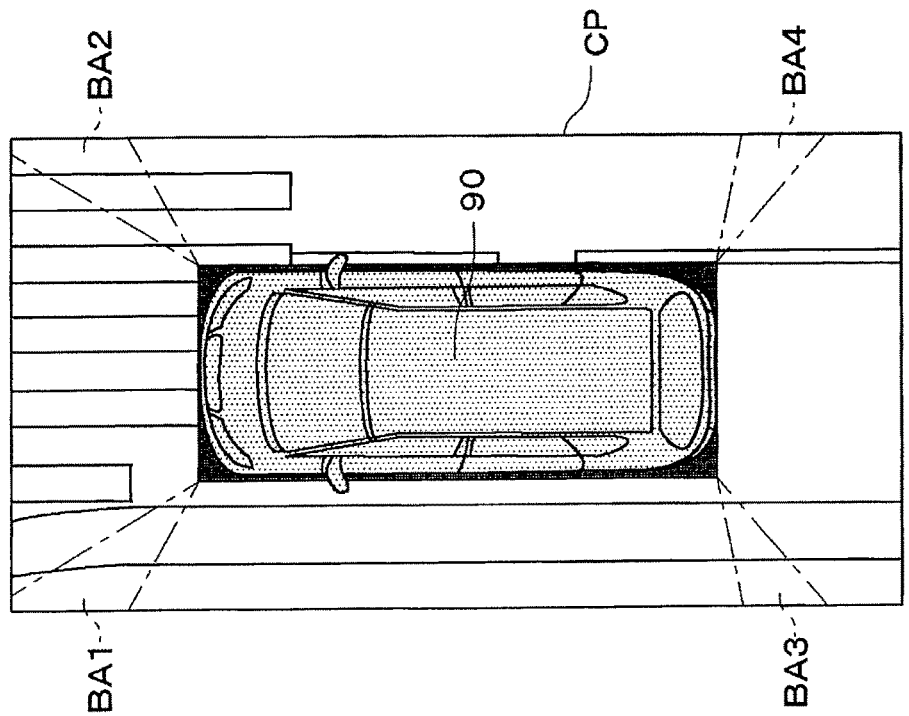

FIG. 20 illustrates examples of the composite image CP generated at the developed and folded states of the side mirrors 93L, 93R. FIG. 20A illustrates the composite image CP generated at the developed state of the side mirrors 93L, 93R, and FIG. 20B illustrates the composite image CP generated at the folded state of the side mirrors 93L, 93R. In FIG. 20, the boundary parts between the captured images in the composite image CP are denoted with the same reference numerals as those denoted for the boundary parts between the parts GF, GB, GL, GR of the stereoscopic curved surface TS in FIG. 4 or 19.

As shown in FIG. 20A, in the composite image CP generated at the developed state of the side mirrors 93L, 93R, the boundary parts BA1 to BA4 between the captured images in the composite image CP are formed by the blending. For this reason, the boundary parts BA1 to BA4 also include the images of the photographic subjects, so that the composite image CP becomes a natural image. In this case, since the composite image CP is generated using the parameters upon development acquired in the calibration processing, it is possible to appropriately superimpose the images of the photographic subjects each other in the blended parts of the composite image CP.

In contrast, as shown in FIG. 20B, in the composite image CP generated at the folded state of the side mirrors 93L, 93R, the captured image data is not used for the boundary parts BB1 to BB4 between the captured images in the composite image CP, so that the achromatic lines are formed. For this reason, the images of the photographic subjects are not included in the lines BB1 to BB4.

In this case, since the composite image CP is generated using the parameters upon folding derived by the calculation, there is a concern that the images of the photographic subjects are composed without being matched. For this reason, the boundary parts between the captured images in the composite image CP are displayed with the lines not including the images of the photographic subjects, so that it is possible to prevent the images of the photographic subjects from being displayed without being matched. Also, since the captured images in the composite image CP are divided by the lines, it is possible to reduce a sense of discomfort that the user feels as the images of the photographic subjects are discontinuous between the captured images.

As described above, according to the image display system 10B of the third illustrative embodiment, the image composition unit 22 is configured to generate the boundary parts between the captured images in the composite image CP by blending the two captured images with the corresponding boundary part being interposed therebetween, at the developed state of the side mirrors 93L, 93R. On the other hand, at the folded state of the side mirrors 93L, 93R, the image composition unit 22 is configured to display the boundary parts between the captured images in the composite image CP with the lines for which the captured images are not used.

At the developed state of the side mirrors 93L, 93R, it is possible to generate the composite image CP, correctly considering the errors in the directions of the optical axes of the side cameras 5L, 5R. For this reason, it is possible to appropriately superimpose the images of the photographic subjects each other in the blended parts of the composite image CP, so that it is possible to generate the natural composite image CP. In contrast, at the folded state of the side mirrors 93L, 93R, the errors in the directions of the optical axes of the side cameras 5L, 5R are inaccurate. For this reason, the boundary parts between the captured images in the composite image CP are displayed with the lines, so that it is possible to prevent the images of the photographic subjects from being superimposed and displayed without being matched.

In the meantime, according to the image display system 10B of the third illustrative embodiment, the parameters upon development are acquired in the calibration processing and the parameters upon folding are derived by the predetermined calculation on the basis of the acquired parameters upon development. To the contrary, the parameters upon folding may be acquired in the calibration processing and the parameters upon development may be derived by a predetermined calculation on the basis of the acquired parameters upon folding. In this case, the image composition unit 22 is configured to display the boundary parts between the captured images in the composite image CP with the lines for which the captured images are not used, as the developed state of the side mirrors 93L, 93R. On the other hand, at the folded state of the side mirrors 93L, 93R, the image composition unit 22 is configured to generate the boundary parts between the captured images in the composite image CP by blending the two captured images with the corresponding boundary part being interposed therebetween.

<4. Modified Embodiments>

Although the illustrative embodiments of the present invention have been described, the present invention is not limited to the illustrative embodiments and can be variously modified. In the below, the modified embodiments are described. All embodiments including the above illustrative embodiments and the following modified embodiments can be appropriately combined.

In the respective illustrative embodiments, the state acquisition unit 20b is configured to acquire the developed or folded state of the side mirrors 93L, 93R, based on the signal transmitted from the mirror driving unit 92. However, the state acquisition unit 20b may be configured to acquire the developed or folded state of the side mirrors 93L, 93R, based on a user's input operation. In this case, the user inputs any state of the developed and folded states of the side mirrors 93L, 93R through the operation buttons 4 or touch panel 31.

Also, in the second and third illustrative embodiments, the mark 70 is formed on the erectable marking member 7. However, the mark 70 may be formed on a main surface of a non-erectable plate-shaped marking member or on a floor of the workplace.

Also, the image generation apparatus 2 of the second and third illustrative embodiments may not have the function as the parameter acquisition apparatus configured to acquire the optical axis parameter. In this case, the image generation apparatus 2 may store the optical axis parameters acquired by a separate parameter acquisition apparatus in the storage unit 27 and use the same when generating the composite image CP.

In the third illustrative embodiment, the boundary part between the captured images in the composite image CP is displayed with the line for which the captured images are not used, at the developed or folded state of the side mirrors 93L, 93R. However, the shape of the image covering the boundary part is not limited to the line and may be appropriately determined inasmuch as it is possible to prevent the images of the photographic subjects from being superimposed and displayed without being matched.

Also, the image display system 10 (10A, 10B) of the respective illustrative embodiments may have the other functions such as a navigation function of guiding a route to a destination, in addition to the function of displaying the display image indicating the periphery of the vehicle 9. When the image display system 10 (10A, 10B) has the navigation function, the navigation function may be activated at a normal state, and when the user performs a predetermined operation, the function of displaying the display image may be activated. The navigation function may be provided in the image generation apparatus 2 or display apparatus 3.

Also, the image display system 10 (10A, 10B) of the respective illustrative embodiments is configured to generate the composite image (an overhead image) viewed from the virtual view point just above the vehicle 9. However, a composite image viewed from a virtual view point of the other position may be also generated.

Also, in the above illustrative embodiments, the various functional units are implemented in software manner by the calculation processing of the CPU in response to the programs. However, parts of the functional units may be implemented by an electrical hardware circuit. Also, to the contrary, a part of functions that are implemented by the hardware circuit may be implemented in software manner.

The present application is based on Japanese Patent Application No. 2012-189604 filed on Aug. 30, 2012, the contents of which being here incorporated for reference.

The invention claimed is:

1. An image generation apparatus used for a vehicle having side mirrors, the image generation apparatus comprising:
   an image acquisition unit operable on a processor and configured to acquire a plurality of captured images obtained by a plurality of cameras including side cameras provided in the side mirrors;
   a generation unit operable on the processor and configured to generate a composite image which indicates a periphery of the vehicle viewed from a virtual viewpoint, by using target areas defined for the respective captured images; and
   a state acquisition unit operable on the processor and configured to acquire a developed or folded state of the side mirrors,
   wherein the generation unit changes the target areas in accordance with the developed or folded state of the side mirrors,
   wherein the generation unit defines the target areas on the basis of a first parameter at the developed state of the side mirrors, and defines the target areas on the basis of a second parameter at the folded state of the side mirrors,
   wherein the first parameter includes an error in directions of optical axes of the side cameras at the developed state of the side mirrors,
   wherein the second parameter includes an error in directions of optical axes of the side cameras at the folded state of the side mirrors, and
   wherein the errors are mounting errors that occur between actual directions of the optical axes of the side cameras relative to the vehicle and designed directions of the optical axes.

2. The image generation apparatus according to claim 1, further comprising:
   a first parameter acquisition unit operable on the processor and configured to acquire the first parameter at an actually developed state of the side mirrors; and
   a second parameter acquisition unit operable on the processor and configured to acquire the second parameter at an actually folded state of the side mirrors.

3. The image generation apparatus according to claim 1, wherein the generation unit generates a boundary part between the plurality of captured images in the composite image by blending two captured images with the corresponding boundary part being interposed therebetween.

4. The image generation apparatus according to claim 1, wherein the generation unit:
   generates a boundary part between the plurality of captured images in the composite image by blending two captured images with the corresponding boundary part being interposed therebetween, at one state of the developed and folded states of the side mirrors; and
   displays a boundary part between the plurality of captured images in the composite image with a mask image for which the captured images are not used, at the other state of the developed and folded states of the side mirrors.

5. An image display system used for a vehicle, the image display system comprising:
   the image generation apparatus according to claim 1; and
   a display apparatus configured to display the composite image output from the image generation apparatus.

6. A parameter acquisition apparatus configured to acquire parameters relating to cameras provided in side mirrors of a vehicle, the parameter acquisition apparatus comprising:
   an acquisition unit operable on a processor and configured to acquire a developed or folded state of the side mirrors;
   a first parameter acquisition unit operable on the processor and configured to acquire a first parameter at an actually developed state of the side mirrors, the first parameter including an error in directions of optical axes of the cameras;
   a second parameter acquisition unit operable on the processor and configured to acquire a second parameter at an actually folded state of the side mirrors, the second parameter including an error in directions of optical axes of the cameras,
   wherein the errors are mounting errors that occur between actual directions of the optical axes of the side cameras relative to the vehicle and designed directions of the optical axes.

7. An image generation method used for a vehicle having side mirrors, the method comprising:

(a) acquiring a plurality of captured images obtained by a plurality of cameras including side cameras provided in the side mirrors;

(b) generating a composite image which indicates a periphery of the vehicle viewed from a virtual viewpoint, by using target areas defined for the respective captured images; and (c) acquiring a developed or folded state of the side mirrors, wherein the process (b) comprises changing the target areas in accordance with the developed or folded state of the side mirrors, wherein the target areas are defined on the basis of a first parameter at the developed state of the side mirrors, and the target areas are defined on the basis of a second parameter at the folded state of the side mirrors, wherein the first parameter includes an error in directions of optical axes of the side cameras at the developed state of the side mirrors, wherein the second parameter includes an error in directions of optical axes of the side cameras at the folded state of the side mirrors, and wherein the errors are mounting errors that occur between actual directions of the optical axes of the side cameras relative to the vehicle and designed directions of the optical axes.

8. A parameter acquisition method of acquiring parameters relating to cameras provided in side mirrors of a vehicle, the method comprising:

(a) acquiring a developed or folded state of the side mirrors;

(b) acquiring a first parameter at an actually developed state of the side mirrors, the first parameter including an error in directions of optical axes of the cameras; and (c) acquiring a second parameter at an actually folded state of the side mirrors, the second parameter including an error in directions of optical axes of the cameras, wherein the errors are mounting errors that occur between actual directions of the optical axes of the side cameras relative to the vehicle and designed directions of the optical axes.

* * * * *